US008996992B2

(12) United States Patent
Kikuchi

(10) Patent No.: US 8,996,992 B2
(45) Date of Patent: Mar. 31, 2015

(54) IMAGE FORMING APPARATUS AND INFORMATION PROCESSING APPARATUS

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 1710 days.

(21) Appl. No.: 11/741,082

(22) Filed: Apr. 27, 2007

(65) Prior Publication Data

US 2007/0255767 A1 Nov. 1, 2007

(30) Foreign Application Priority Data

May 1, 2006 (JP) .................................. 2006-127884

(51) Int. Cl.
G06F 17/00 (2006.01)
G06F 11/14 (2006.01)

(52) U.S. Cl.
CPC ........ *G06F 11/1469* (2013.01); *G06F 11/1458* (2013.01); *G06F 11/1471* (2013.01)
USPC ........................................................ 715/255

(58) Field of Classification Search
USPC ................... 715/229, 255; 707/200, 203, 204
See application file for complete search history.

(56) References Cited

U.S. PATENT DOCUMENTS

| 5,623,661 | A | * | 4/1997 | Hon ........................................ 1/1 |
| 5,692,143 | A | * | 11/1997 | Johnson et al. ................ 715/764 |
| 5,757,372 | A | * | 5/1998 | Krause et al. ................. 715/840 |
| 5,806,078 | A | * | 9/1998 | Hug et al. ...................... 715/205 |
| 5,831,617 | A | * | 11/1998 | Bhukhanwala ................ 715/839 |
| 5,943,678 | A | * | 8/1999 | Hocker et al. ................. 715/202 |
| 5,946,689 | A | * | 8/1999 | Yanaka et al. ........................ 1/1 |
| 5,991,780 | A | * | 11/1999 | Rivette et al. ................. 715/255 |
| 6,959,310 | B2 | * | 10/2005 | Eshel et al. ............................ 1/1 |
| 7,134,071 | B2 | * | 11/2006 | Ohwada et al. ............... 715/229 |
| 7,234,116 | B2 | * | 6/2007 | Watanabe et al. ............. 715/758 |

(Continued)

FOREIGN PATENT DOCUMENTS

JP 05-289927 A 11/1993
JP 06-139117 A 5/1994

(Continued)

OTHER PUBLICATIONS

"Microsoft Office Training: A Guide to Word 2003", U.S. Microsoft Corporation. http://office.microsoft.com/training/Training.aspx?AssetID=RP010736521041&CTT=6 &Origin=RC010736361041 (Japanese Version/mentioned in the specification).

(Continued)

*Primary Examiner* — Laurie Ries
(74) *Attorney, Agent, or Firm* — Cowan, Liebowitz & Latman, P.C.

(57) ABSTRACT

An object of this invention is to return a file changed on an arbitrary application to the state before change and improve the convenience of a user in the restoring operation. This invention provides an information processing apparatus capable of executing an application, which includes a display image log recording unit that repeatedly captures a display image when the application is activated, a content log recording unit that stores a backup file before change every time the file loaded by the activated application is changed and saved, a log association unit that associates content log information with display image log information, a display image log selection unit that displays the captured display image, and an application activation unit that loads the backup file associated with the display image designated by a user and activates the application.

12 Claims, 23 Drawing Sheets

(56) References Cited

U.S. PATENT DOCUMENTS

| | | | |
|---|---|---|---|
| 7,810,025 B2 * | 10/2010 | Blair et al. | 715/239 |
| 8,005,843 B2 * | 8/2011 | Sweet et al. | 707/741 |
| 8,020,083 B1 * | 9/2011 | Kembel et al. | 715/201 |
| 8,473,865 B2 * | 6/2013 | Huang et al. | 715/810 |
| 8,520,900 B2 * | 8/2013 | Rhoads et al. | 382/107 |
| 2002/0054112 A1 * | 5/2002 | Hasegawa et al. | 345/764 |
| 2002/0055942 A1 * | 5/2002 | Reynolds | 707/200 |
| 2003/0120593 A1 * | 6/2003 | Bansal et al. | 705/39 |
| 2004/0010732 A1 * | 1/2004 | Oka | 714/13 |
| 2004/0027398 A1 * | 2/2004 | Jaeger | 345/863 |
| 2005/0010864 A1 * | 1/2005 | Horikiri et al. | 715/511 |
| 2005/0160356 A1 * | 7/2005 | Albornoz et al. | 715/512 |
| 2005/0210380 A1 * | 9/2005 | Kramer et al. | 715/518 |
| 2005/0262174 A1 * | 11/2005 | Lohn et al. | 707/204 |
| 2006/0010420 A1 * | 1/2006 | Peterson et al. | 717/106 |
| 2006/0041840 A1 * | 2/2006 | Blair et al. | 715/513 |
| 2006/0101384 A1 * | 5/2006 | Sim-Tang et al. | 717/104 |
| 2006/0200639 A1 * | 9/2006 | Levy et al. | 711/162 |
| 2006/0206536 A1 * | 9/2006 | Sawdon et al. | 707/200 |
| 2006/0268339 A1 * | 11/2006 | Tsai | 358/1.15 |
| 2007/0198515 A1 * | 8/2007 | Ando et al. | 707/7 |
| 2008/0077848 A1 * | 3/2008 | Roberts | 715/229 |
| 2009/0307579 A1 * | 12/2009 | Gelman et al. | 715/229 |

FOREIGN PATENT DOCUMENTS

| | | |
|---|---|---|
| JP | 09-026905 | 1/1997 |
| JP | 11-327980 A | 11/1999 |
| JP | 2001-142750 A | 5/2001 |

OTHER PUBLICATIONS http://office.microsoft.com/training/Training.aspx?AssetID=RP100140261033&CTT=6&Origin=RC100140951033 (English Version).
The above references were cited in a Oct. 14, 2011 Japanese Office Action, a copy of which is enclosed without English Translation, that issued in Japanese Patent Application No. 2006-127884.

* cited by examiner

IMAGE FORMING APPARATUS AND INFORMATION PROCESSING APPARATUS

BACKGROUND OF THE INVENTION

1. Field of the Invention

The present invention relates to an information processing technique of saving a file change log and restoring a state before change, as needed.

2. Description of the Related Art

Recently, various kinds of information processing apparatuses capable of installing and executing arbitrary applications, including a personal computer (to be referred to as a PC hereinafter) and a personal digital assistant (to be referred to as a PDA hereinafter), are becoming popular in every field such as business, education, and household. Users daily browse and edit a variety of data such as videos, photos, documents, and graphics by using these applications.

Under these circumstances, various techniques of managing, for example, a data edit log and freely restoring the initial state have been proposed to improve the convenience of user's edit operations on applications.

For example, a general application has a restoring function called "undo" to cancel preceding data edit operations within a predetermined range and restore previous data. The restoring function is disclosed in detail in, for example, "Microsoft® Office Training: A Guide to Word 2003", U.S. Microsoft Corporation, http://office.microsoft.com/training/Training.aspx?AsseLID=RP010736521041&CTT=6&Origin=RC010736361041.

Japanese Patent Laid-Open No. 09-026905 proposes a technique of allowing a user to return updated data to previous contents at an arbitrary point in time in the past without being conscious of data saving/management. More specifically, this technique is implemented by imparting a difference storage means to an operating system (OS) and storing updated file contents as difference log information. According to this reference, when a user designates a date/time to restore a file, the file at the designated date/time is restored by referring to the file and difference log information.

However, if each application has a restoring function, as described above, and the restoration count and reset conditions change between the applications, the user may be confused. In some cases, data that the user has considered restorable cannot be restored.

The arrangement of Japanese Patent Laid-Open No. 09-026905, which adds the difference storage means to the OS and restores a file by referring to difference log information based on a restoration date/time, does not depend on any application and therefore can avoid such situations. In this technique, however, the user himself/herself must remember the date/time when the state to be restored is saved, resulting in inconvenience for the user.

SUMMARY OF THE INVENTION

The present invention has been made in consideration of the above-described problems, and achieves to provide an information processing apparatus capable of returning a file changed on an arbitrary application to the state before change and improving the convenience of a user in the restoring operation. That is, an information processing apparatus capable of executing an application, comprising:

a first storage unit configured to store, as a plurality of pieces of image information, display images obtained by repeatedly capturing a display image when the application is activated;

a second storage unit configured to store information to restore a file before change every time contents of the file loaded by the activated application are changed and saved;

an association unit configured to associate the pieces of information stored in the first storage unit and the second storage unit with each other;

a display unit configured to display the image information stored in the first storage unit; and a reproduction unit configured to restore the file by using, of the image information displayed by the display unit, information that is stored in the second storage unit and associated by the association unit with the image information designated by a user.

According to the present invention, it is possible to return a file changed on an arbitrary application to the state before change and improve the convenience of a user in the restoring operation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

The outline of the embodiments of the present invention will be described first. As a characteristic feature of an information processing apparatus to be described below, when a user activates an application and starts editing content on it, the information processing apparatus automatically captures display image corresponding to the display window during operation and generates display image data. As another characteristic feature, the information processing apparatus stores the captured display image, the application that is activated and is in the active state, and the content on the application in association with each other.

As still another characteristic feature, the information processing apparatus can read out captured display images by a predetermined operation and continuously display them in the order of capture. A desired one of the captured display images is displayed, and in this state, a predetermined operation is executed to activate the application stored in association with the display image. Then, the content stored in association with the display image can be read out, as still another characteristic feature.

This characteristic arrangement allows a user to easily return content under editing to an arbitrary state while referring to captured images and improves the convenience to the user in the restoring operation. Additionally, restoration is possible independently of the type of activated application.

The embodiments of the present invention will be described below in detail with reference to the accompanying drawings as needed.

First Embodiment

<1. Hardware Configuration of Information Processing Apparatus>

Figure 1:
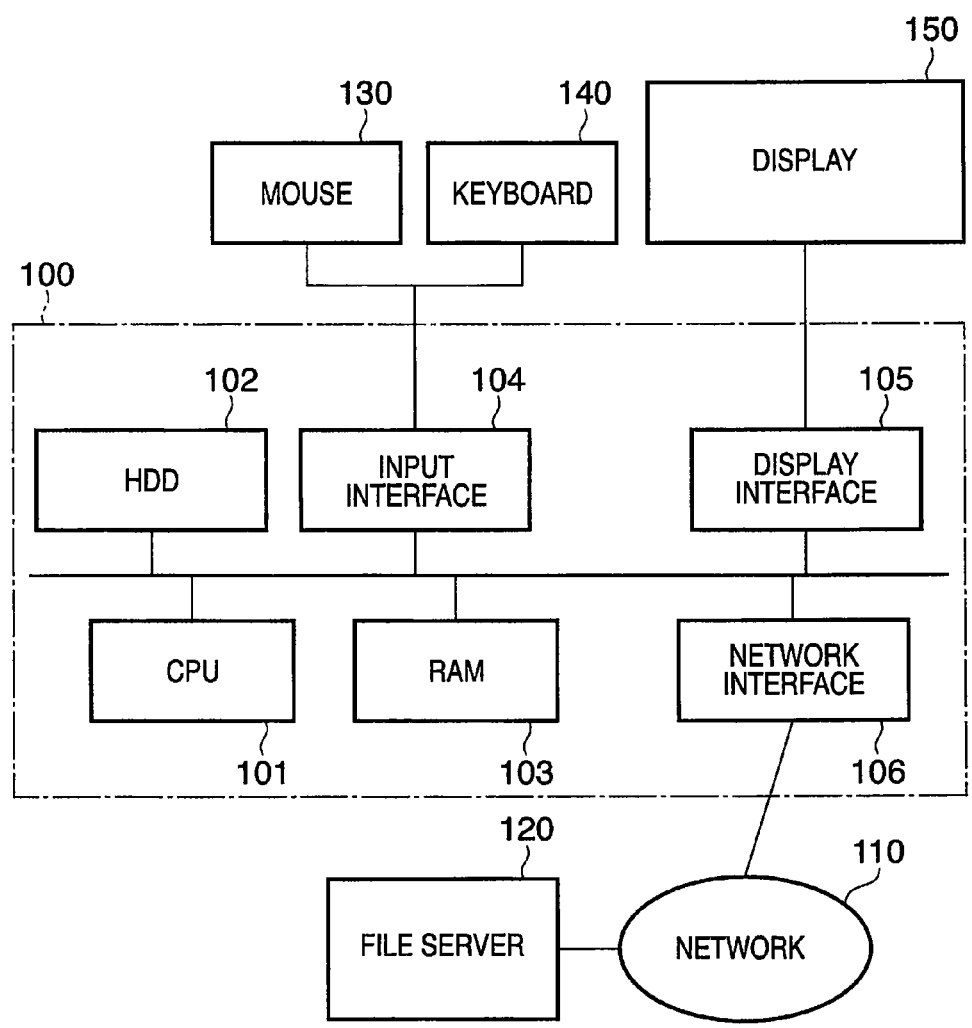
FIG. 1 is a block diagram showing the hardware configuration of an information processing apparatus.

FIG. 1 is a block diagram showing the hardware configuration of an information processing apparatus and attached devices according to the first embodiment. As shown in FIG. 1, an information processing apparatus 100 comprises a CPU 101, RAM 103, hard disk drive (HDD) 102, input interface 104, display interface 105, and network interface 106.

A mouse 130 and a keyboard 140 connect to the input interface 104. A display 150 connects to the display interface 105. A file server 120 connects to the network interface 106 via a network 110.

An operating system (to be referred to as an OS hereinafter), process programs, application programs, and device drivers of this embodiment are stored in the HDD 102, although not illustrated. They are temporarily stored in the RAM 103 and executed by the CPU 101, as needed.

The input interface 104 receives an input signal from the mouse 130 or keyboard 140 and converts it into information processible by a corresponding device driver. The display interface 105 converts image information from a corresponding device driver into a signal processible by the display 150. The network interface 106 receives a signal from the network 110 and converts it into information processible by a corresponding device driver. The network interface 106 also converts transmission information from the device driver into a signal transmittable via the network 110.

<2. Functional Arrangement of Information Processing Apparatus>

Figure 2:
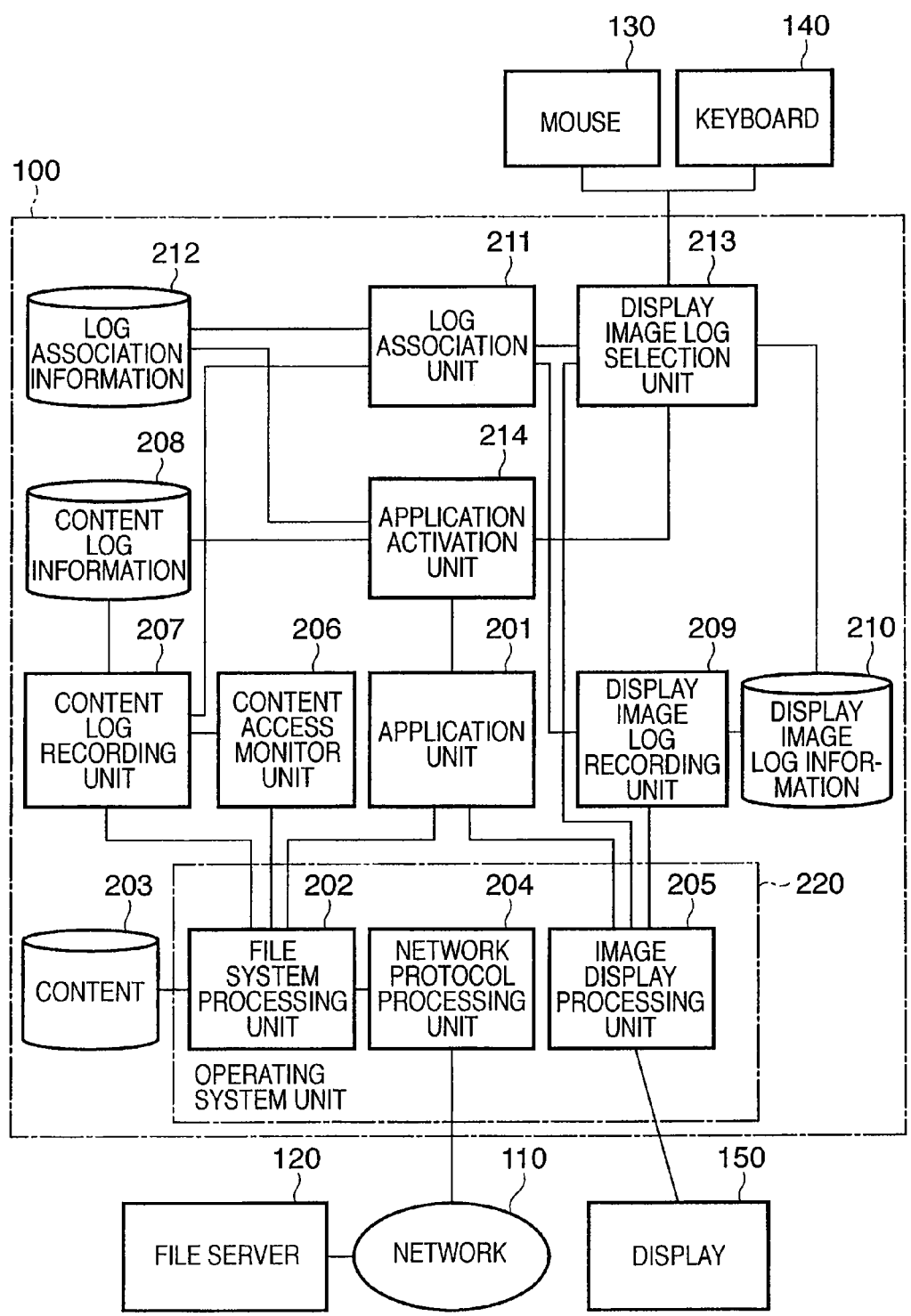
FIG. 2 is a block diagram showing the functional arrangement of the information processing apparatus.

FIG. 2 is a block diagram showing the functional arrangement of the information processing apparatus 100 of this embodiment. As shown in FIG. 2, the information processing apparatus 100 comprises an operating system unit 220 and an application unit 201. The information processing apparatus 100 also comprises a content access monitor unit 206, content log recording unit 207, display image log recording unit 209, log association unit 211, display image log selection unit 213, and application activation unit 214 as components to implement the restoring function.

<2.1 Arrangements of Operating System Unit and Application Unit>

The operating system unit 220 includes a file system processing unit 202, network protocol processing unit 204, and image display processing unit 205.

The file system processing unit 202 manages a content 203 and contents in the file server 120 by using files and folders.

The network protocol processing unit 204 transmits/receives control packets and data packets based on a file sharing protocol and various subordinate protocols such as TCP/IP and manages the communication state via the network interface 106.

The image display processing unit 205 controls the rendering function of the display interface 105 based on a rendering instruction from the application unit 201.

The application unit 201 is an arbitrary application to browse or edit the content 203.

<2.2 Arrangement to Implement Restoring Function>

Of the information processing apparatus 100 of this embodiment, an arrangement to implement the restoring function will be described next.

The content access monitor unit 206 hooks a system call processed by the file system processing unit 202 and monitors the contents (e.g., read, write, and overwrite) of access to the content 203.

The content log recording unit 207 reads out a content as an access target, as needed, and stores it in a content log folder together with a predetermined content log file name based on the monitor result of the content access monitor unit 206. More specifically, when a content overwrite instruction is input, the content log recording unit 207 stores, in the content log folder, the content before the overwrite as a backup file with a content log file name.

A plurality of backup files having content log file names and stored in the content log folder will be collectively referred to as "content log information" 208.

In storing a backup file, the content log recording unit 207 notifies the log association unit 211 (to be described later) of information necessary for an association process and, more specifically, a content log file name and application identification information.

The display image log recording unit 209 hooks a system call processed by the image display processing unit 205, captures the display image displayed on the display 150, and generates display image data. The display image log recording unit 209 registers the display image data in display image log information 210 together with display image identification information to identify the captured display image.

In registering in the display image log information 210, the display image log recording unit 209 notifies the log association unit 211 of information necessary for an association process and, more specifically, display image identification information.

The log association unit 211 registers, in log association information 212, the pieces of information received from the content log recording unit 207 and display image log recording unit 209 and, more specifically, the display image identification information, application identification information, and content log file name in association with each other.

The display image log selection unit 213 starts the operation in accordance with a predetermined user operation. The display image log selection unit 213 starts the operation and displays a display image log selection user interface (to be described later) on the display 150.

At this time, display image data about a captured display image is read out from the display image log information 210 and displayed on the display image log selection user interface. When the user selects a desired one of the display image data displayed on the display image log selection user interface, the application activation unit 214 is notified of display image identification information corresponding to the display image data. The desired display image data selected by the user indicates display image data about a display image where the contents of information to be restored are displayed.

Upon receiving the display image identification information from the display image log selection unit 213, the application activation unit 214 refers to the log association information 212. The application activation unit 214 recognizes application identification information and content log file name registered in association with the display image identification information.

Then, the application activation unit 214 activates an application corresponding to the application identification information and reads out a backup file having the recognized content log file name from the content log folder.

With this process, the state of the display window corresponding to the display image data selected by the user can be restored.

<3. Configuration of Content Log Information 208>

Figure 3:
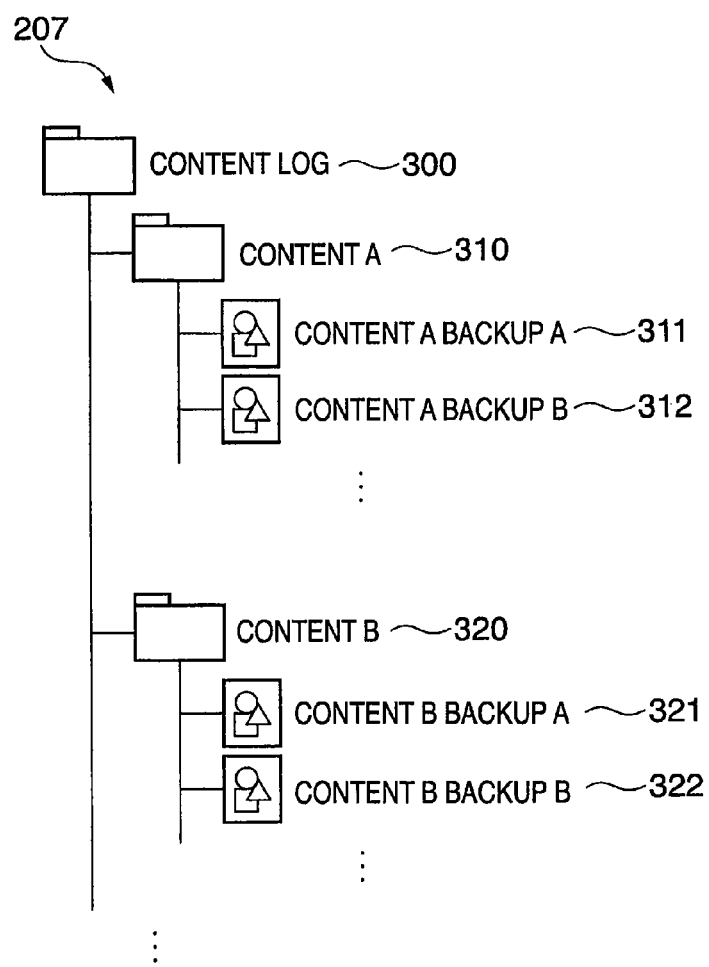
FIG. 3 is a conceptual view showing the configuration of content log information in the information processing apparatus.

FIG. 3 is a conceptual view (example) showing the configuration of the content log information 208 in the information processing apparatus 100 of this embodiment. In FIG. 3, a content log folder 300 includes a content A folder 310 and a content B folder 320.

The content A folder 310 stores a backup file 311 (content log file name: content A backup A) as a backup of content A at a point in time. The content A folder 310 also stores a backup file 312 (content log file name: content A backup B) as a backup at another point in time.

The content B folder 320 stores a backup file 321 (content log file name: content B backup A) as a backup of content B at a point in time. The content B folder 320 also stores a backup file 322 (content log file name: content B backup B) as a backup at another point in time. The file names, the number of files, the number of folders, and the folder structure are not limited to those described above.

<4. Configuration of Display Image Log Information 210>

Figure 4:
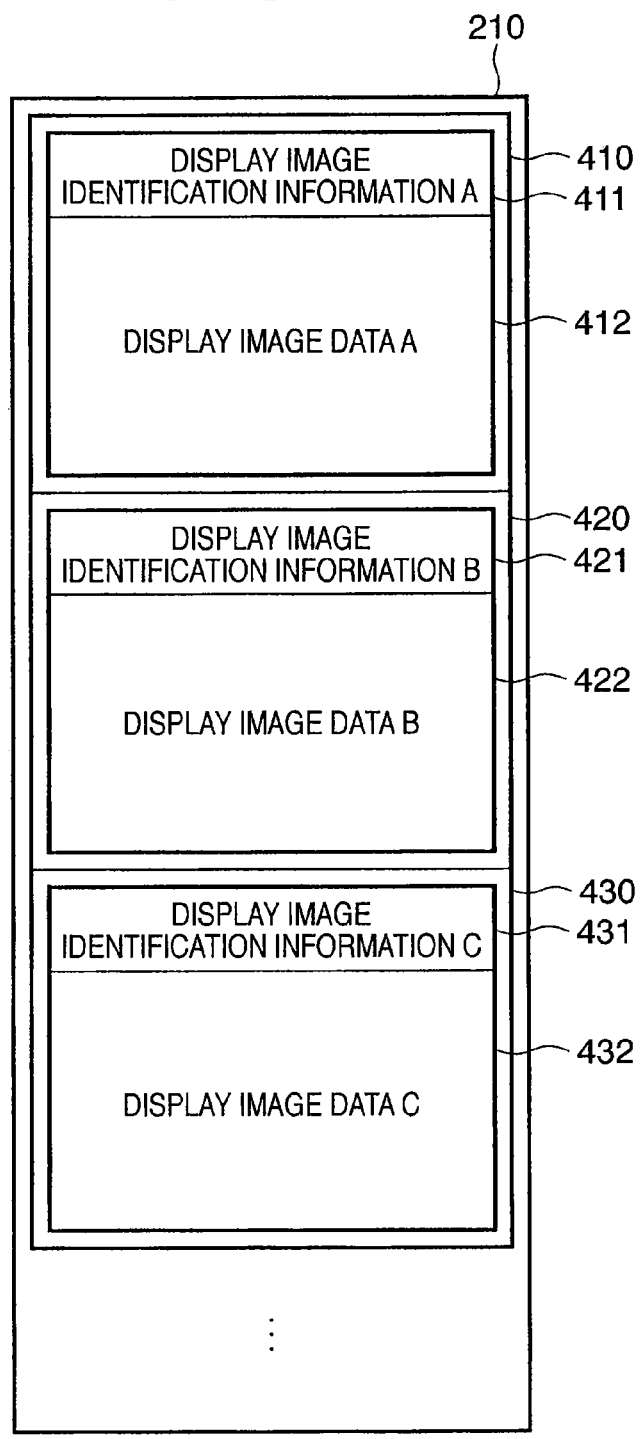
FIG. 4 is a conceptual view of display image log information of the information processing apparatus.

FIG. 4 is a conceptual view (example) of the display image log information 210 of the information processing apparatus 100 of this embodiment. As shown in FIG. 4, the display image log information 210 includes pieces of display image information 410, 420, and 430 each corresponding to a captured display image. These pieces of information are arranged in the order of capture 430→420→410.

The pieces of display image information 410, 420, and 430 each corresponding to a captured display image contain pieces of display image identification information 411, 421, and 431 to identify the display images and captured display image data 412, 422, and 432, respectively. The number of pieces of display image information registered in the display image log information 210 and its data structure are not limited to those described above.

<5. Configuration of Log Association Information 212>

Figure 5:
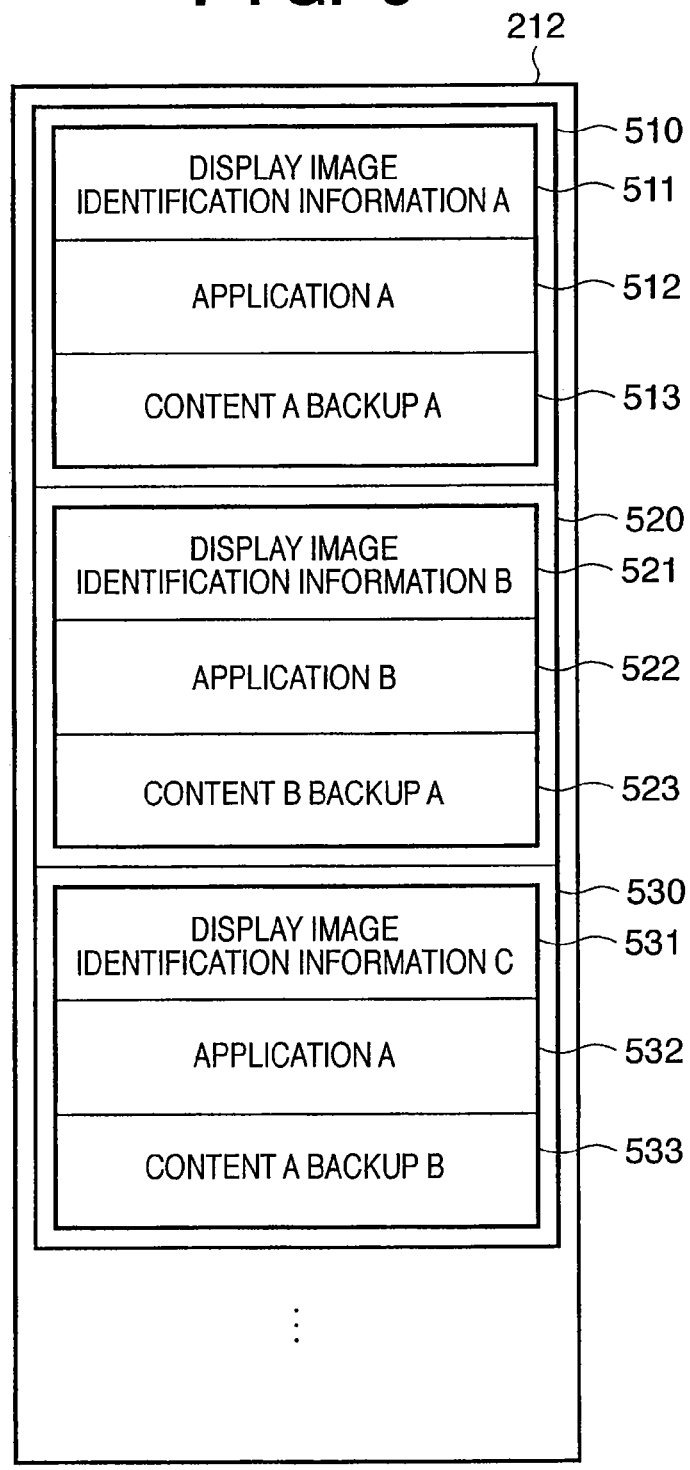
FIG. 5 is a conceptual view of log association information of the information processing apparatus.

FIG. 5 is a conceptual view (example) of the log association information 210 of the information processing apparatus 100 of this embodiment. The log association information 212 is generated every time a content log file name and application identification information are received from the content log recording unit 207.

As shown in FIG. 5, the log association information 212 includes pieces of association information 510, 520, and 530 each corresponding to one association. The pieces of association information 510, 520, and 530 each corresponding to an association contain pieces of display image identification information 511, 521, and 531, pieces of application identification information 512, 522, and 532, and content log file names 513, 523, and 533, respectively. The number of pieces of association information in the log association information 212 and the data structure are not limited to those described above.

<6. Display Image Log Selection User Interface>

Figure 6:
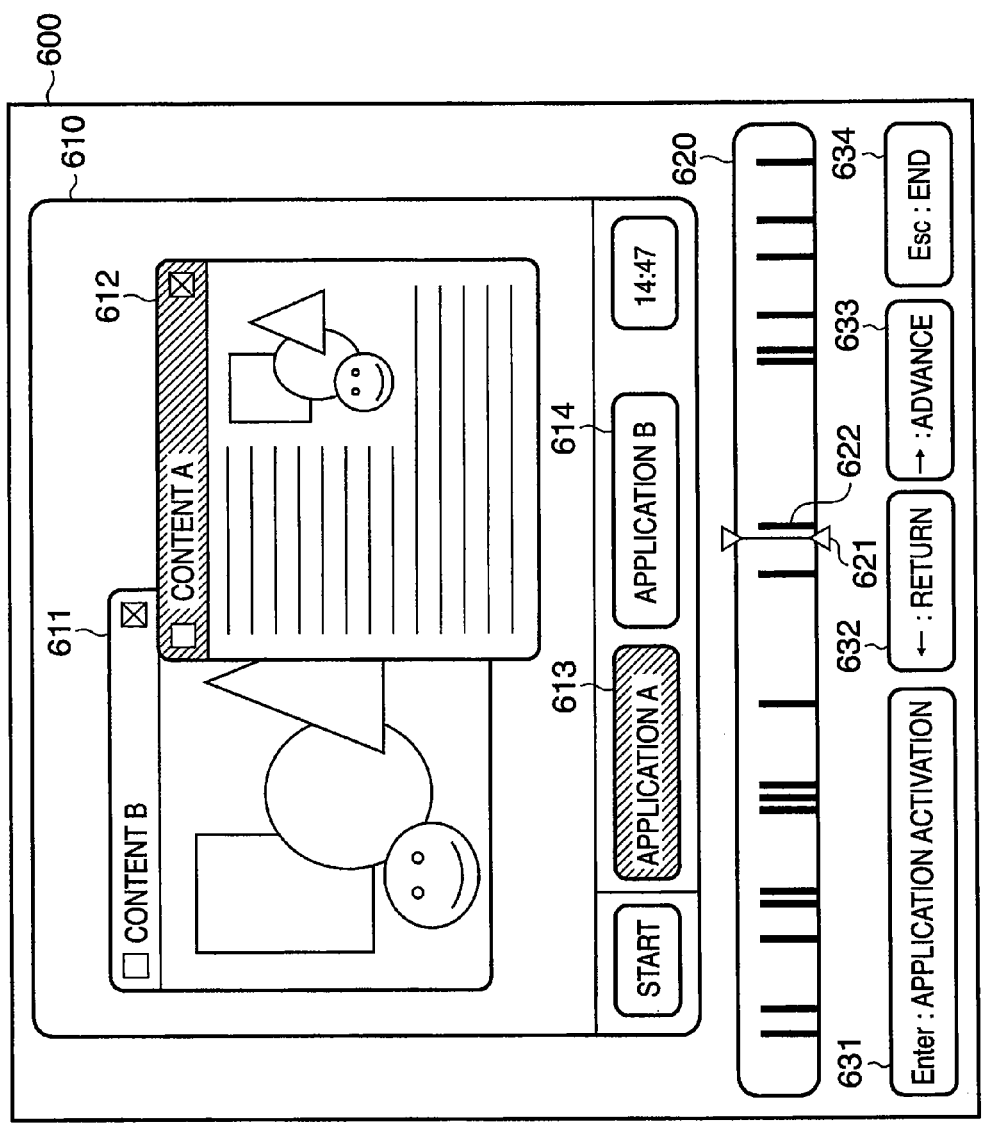
FIG. 6 is a view showing an example of a display image log selection user interface displayed on a display by a display image log selection unit.

FIG. 6 is a view showing an example of a display image log selection user interface generated by the display image log selection unit 213 and displayed on the display 150. A display image log selection user interface 600 is displayed on the display 150 when the user executes a predetermined operation (e.g., when the user clicks on a predetermined function key).

As shown in FIG. 6, the display image log selection user interface 600 has a capture display area 610 that shows display image data registered in the display image log information 210. The display image log selection user interface 600 also has a content log display area 620 that indicates the storage timings of the backup files stored in the content log folder 300.

FIG. 6 shows an example wherein applications A and B are activated (613 and 614), contents A and B are read out (611 and 612), and application A is active on the display 150 upon capture.

The content log display area 620 indicates the backup file stored in the content log folder 300 in time-series along the time axis (in the example in FIG. 6, the backup files stored in the content A folder 310 are indicated). A content log indicator 622 indicates the presence/absence of a backup file on the time axis. An indicator 621 indicates the time-axis position of a display image currently displayed in the capture display area 610.

The display image log selection user interface 600 also has an application activation button 631, return button 632, advance button 633, and end button 634.

The application activation button 631 activates the active application in the display image currently displayed in the capture display area 610 and reads out the content loaded by the application in the display image.

In the example in FIG. 6, when the application activation button 631 is clicked on, application A associated with the display image currently displayed in the capture display area 610 is activated based on the log association information 212.

In addition, of the backup files stored in the content A folder 310, a backup file associated with the display image currently displayed in the capture display area 610 is read out and displayed based on the log association information 212.

The return button 632 reads out, from the display image log information 210, immediately preceding display image data of the display image currently displayed in the capture display area 610 and displays the readout display image data in the capture display area 610.

The advance button 633 reads out, from the display image log information 210, immediately succeeding display image data of the display image currently displayed in the capture display area 610 and displays the readout display image data in the capture display area 610.

The end button 634 closes the display image log selection user interface 600.

<7. Process Procedure in Information Processing Apparatus>

<7.1 Procedure of Overall Process>

Figure 7:
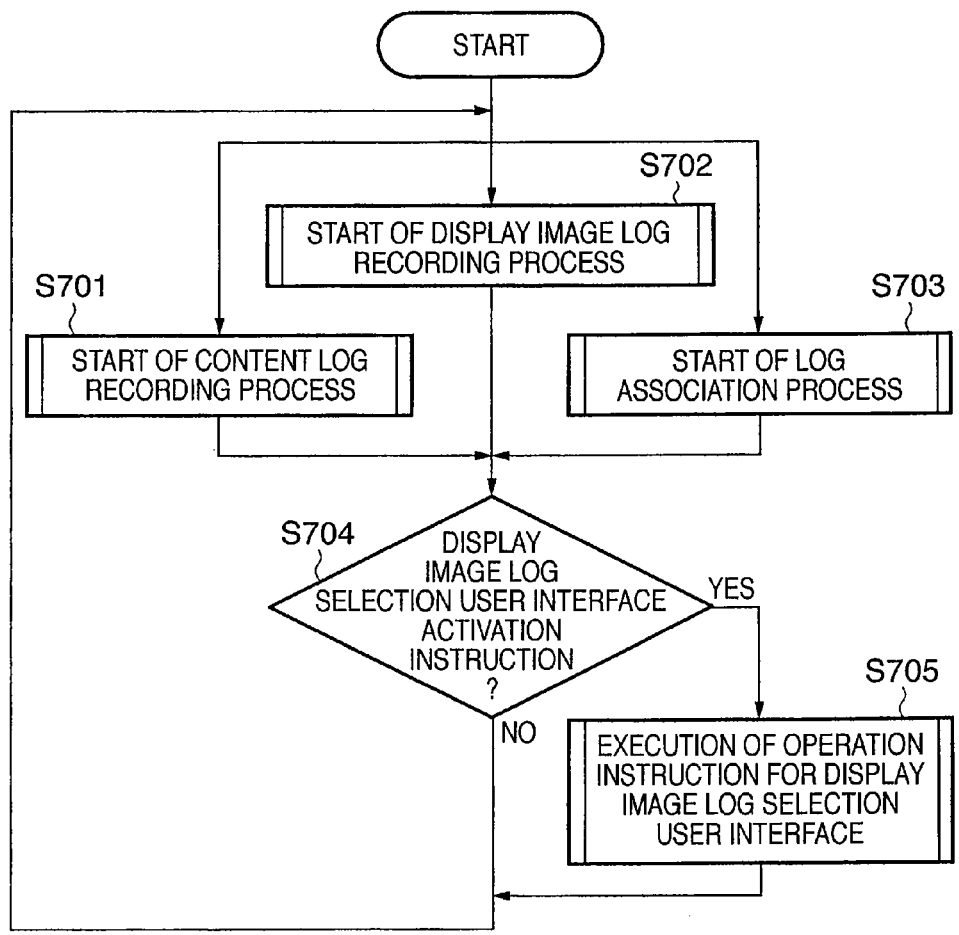
FIG. 7 is a flowchart showing a process procedure when an application is activated in the information processing apparatus.

FIG. 7 is a flowchart showing a process procedure when an arbitrary application is activated in the information processing apparatus 100 of this embodiment. When an application is activated, a content log recording process is activated in step S701. In step S702, a display image log recording process is activated. In step S703, a log association process is activated.

In step S704, it is determined whether an activation instruction of the display image log selection user interface 600 is input. To restore a state before editing in the editing operation of content loaded on the application, the user activates the display image log selection user interface 600 by clicking on a predetermined function key. Hence, in step S704, the presence/absence of the activation instruction of the display image log selection user interface 600 is determined by checking whether the function key is clicked on.

If it is determined in step S704 that the activation instruction of the display image log selection user interface 600 is input, the process advances to step S705 to start receiving various user operation instructions for the display image log selection user interface 600.

If it is determined in step S704 that no activation instruction of the display image log selection user interface 600 is input, the process returns to steps S701 to S703.

As described above, when an application is activated, and the content editing operation starts, the information processing apparatus 100 of this embodiment automatically starts the content log recording process, display image log recording process, and log association process. The process continues until the information processing apparatus 100 is shut down. When the user clicks on a predetermined function key to restore a state before editing, the display image log selection user interface 600 is displayed so that the state desired by the user can be restored.

<7.2 Procedure of Content Log Recording Process>

Figure 8:
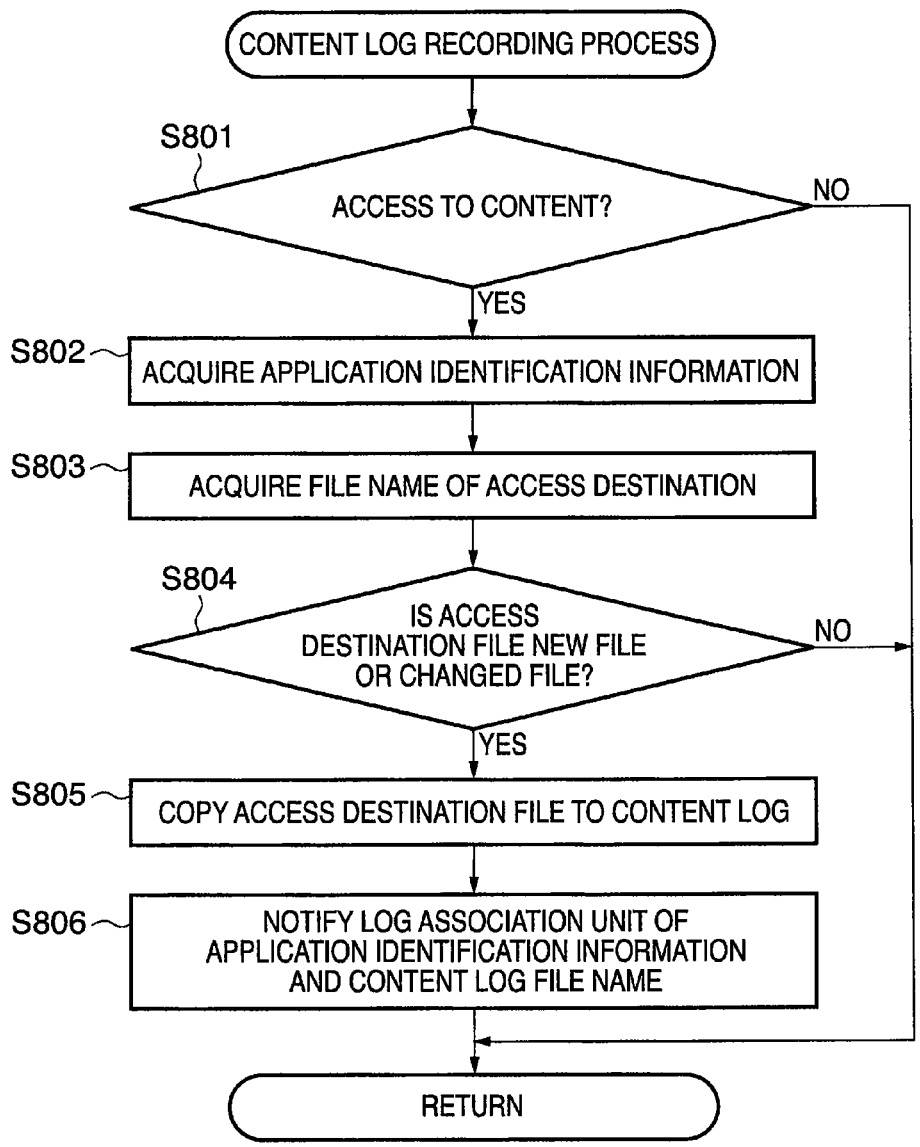
FIG. 8 is a flowchart showing a detailed process procedure of a content log recording process.

FIG. 8 is a flowchart showing a detailed process procedure of the content log recording process (step S701 in FIG. 7) of this embodiment. When the content log recording process starts, the content access monitor unit 206 confirms the presence/absence of access (e.g., read, write, and overwrite) to the content 203 (step S801).

If no access to the content 203 exists (NO in step S801), the content log recording process is ended (the process advances to step S704 in FIG. 7).

If access to the content 203 exists, the process advances to step S802. In step S802, the content log recording unit 207 acquires, from the file system processing unit 202, the application identification information of the application that has accessed the content 203.

In step S803, the file name of the access destination is acquired. In step S804, the content log information 208 is searched on the basis of the acquired file name of the access destination.

More specifically, it is confirmed whether the content log folder 300 contains a folder having the same file name as the file name of the access destination. If the content log folder 300 contains no folder having the same file name as the file name of the access destination, the content with the file name of the access destination is determined as a new file. If the content log folder 300 contains a folder having the same file name as the file name of the access destination, the content with the file name of the access destination is determined not to be a new file.

If it is determined that the content with the file name of the access destination is no new file, a backup file in the folder with the file name of the access destination is searched for. The contents of the latest backup file are compared with those of the file of the access destination. If the contents of the latest backup file match those of the file of the access destination (e.g., when the user instructs overwrite without editing operation), it is determined that no change exists. If the contents of the latest backup file do not match those of the file of the access destination, it is determined that a change exists.

If it is determined in step S804 that neither the content is a new file nor has a change, the content log recording process is ended. If it is determined in step S804 that the content is a new file or has a change in the file contents, the process advances to step S805.

In step S805, the file of the access destination is assigned a content log file name and copied in the content log folder 300 (FIG. 3). In step S806, the log association unit 211 is notified of the application identification information and content log file name. When notification finishes, the content log recording process is ended.

A description will be done assuming that the file of the access destination is stored in the content 203. However, the present invention is not limited to this.

<7.3 Procedure of Display Image Log Recording Process>

Figure 9:
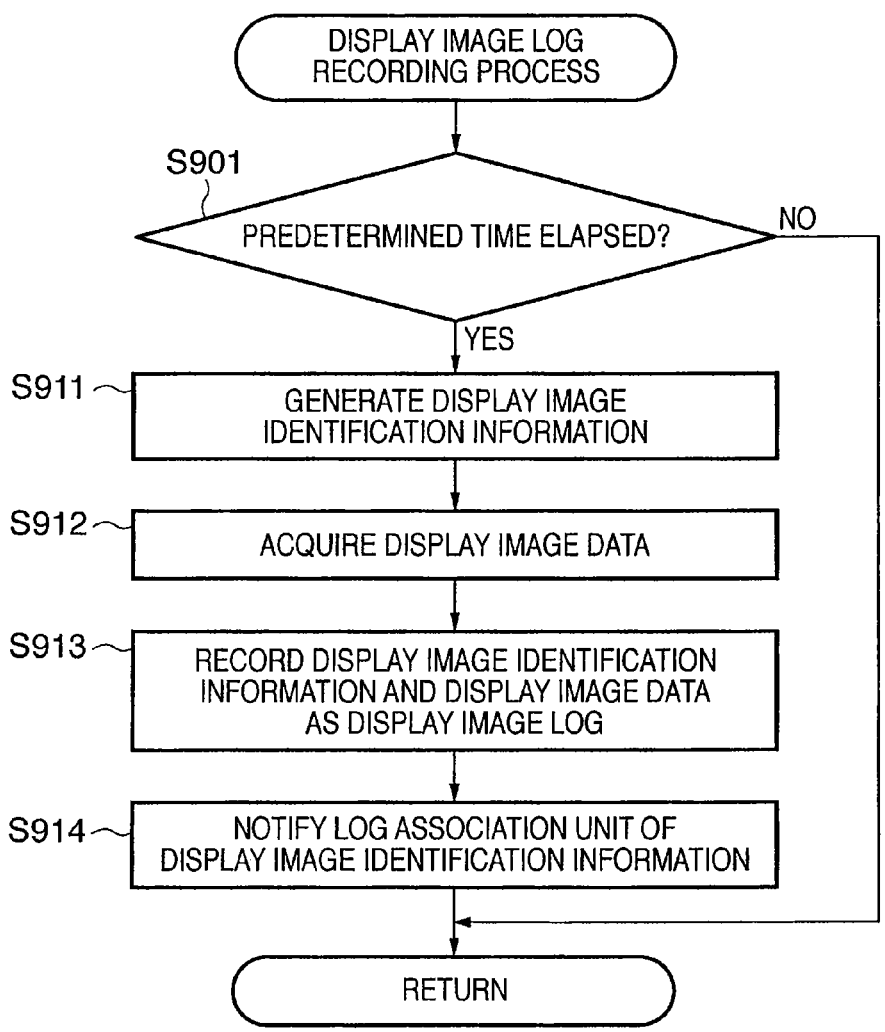
FIG. 9 is a flowchart showing a detailed process procedure of a display image log recording process.

FIG. 9 is a flowchart showing a detailed process procedure of the display image log recording process (step S702 in FIG. 7) of this embodiment. When the display image log recording process starts, the display image log recording unit 209 confirms the elapse of a predetermined time in step S901. If the predetermined time has not elapsed, the display image log recording process is ended.

If it is determined in step S901 that the predetermined time has elapsed, the process advances to step S911. In step S911, the display image log recording unit 209 generates display image identification information to uniquely identify the display image after the elapse of the predetermined time.

In step S912, display image data obtained by capturing the display image at that time is acquired from the image display processing unit 205. In step S913, the display image log recording unit 209 registers, in the display image log information 210, the display image identification information generated in step S911 and the display image data acquired in step S912.

In step S914, the log association unit 211 is notified of the display image identification information. When notification finishes, the display image log recording process is ended.

<7.4 Procedure of Log Association Process>

Figure 10:
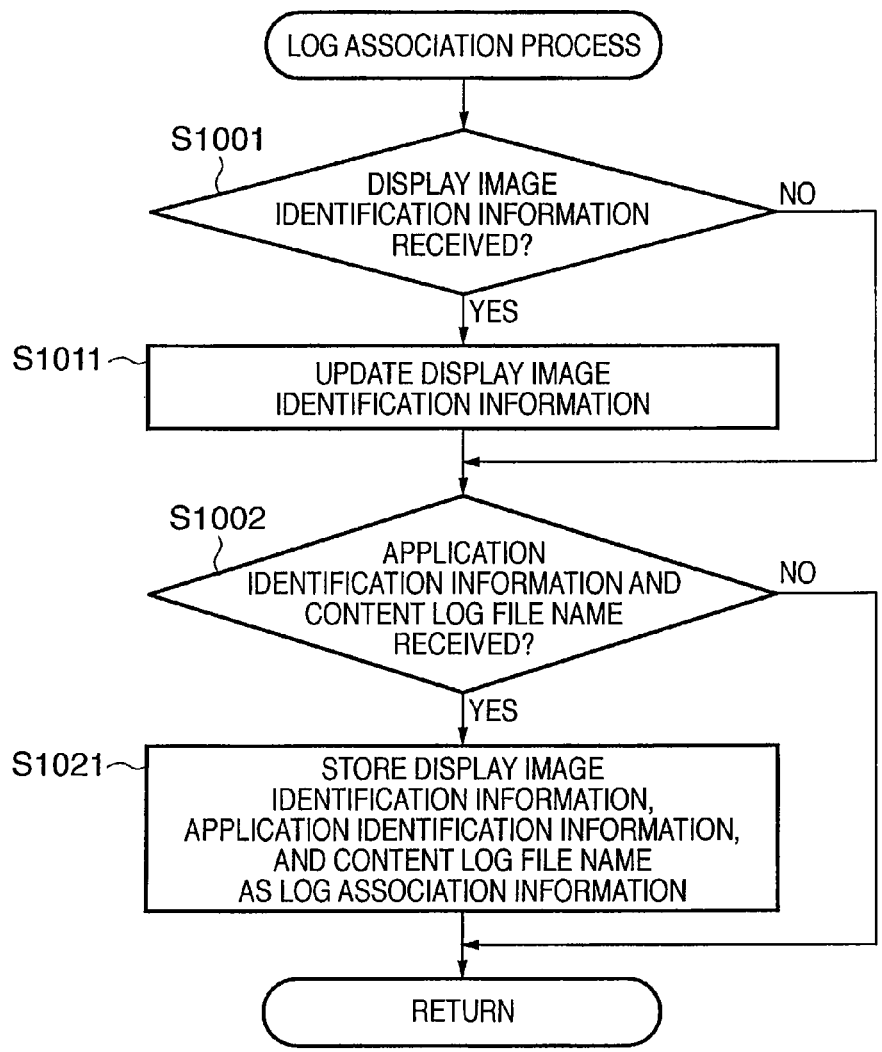
FIG. 10 is a flowchart showing a detailed process procedure of a log association process.

FIG. 10 is a flowchart showing a detailed process procedure of the log association process (step S703 in FIG. 7) of this embodiment. When the log association process starts, the log association unit 211 determines in step S1001 whether display image identification information is received from the display image log recording unit 209. If it is determined in step S1001 that no display image identification information is received, the process advances to step S1002 to determine whether application identification information and a content log file name are received from the content log recording unit 207.

If it is determined in step S1002 that neither application identification information nor a content log file name is received, the log association process is ended.

If it is determined in step S1001 that display image identification information is received, the process advances to step S1011 to temporarily store the display image identification information in a predetermined area of the RAM 103. If display image identification information is already stored in the predetermined area of the RAM 103, it is updated.

If it is determined in step S1002 that application identification information and a content log file name are received, the process advances to step S1021. In step S1021, the display image identification information stored in the predetermined area of the RAM 103 and the received application identification information and content log file name are sequentially registered in the log association information 212. The display image identification information stored in the predetermined area of the RAM 103 is cleared once it is registered in the log association information 212.

As described above, the log association unit 211 temporarily stores display image identification information to identify display images captured at a predetermined interval. When application identification information and a content log file name are received, they are stored as log association information together with the temporarily stored display image identification information.

<7.5 Procedure of Process for Operation Instruction for Display Image Log Selection User Interface>

Figure 11:
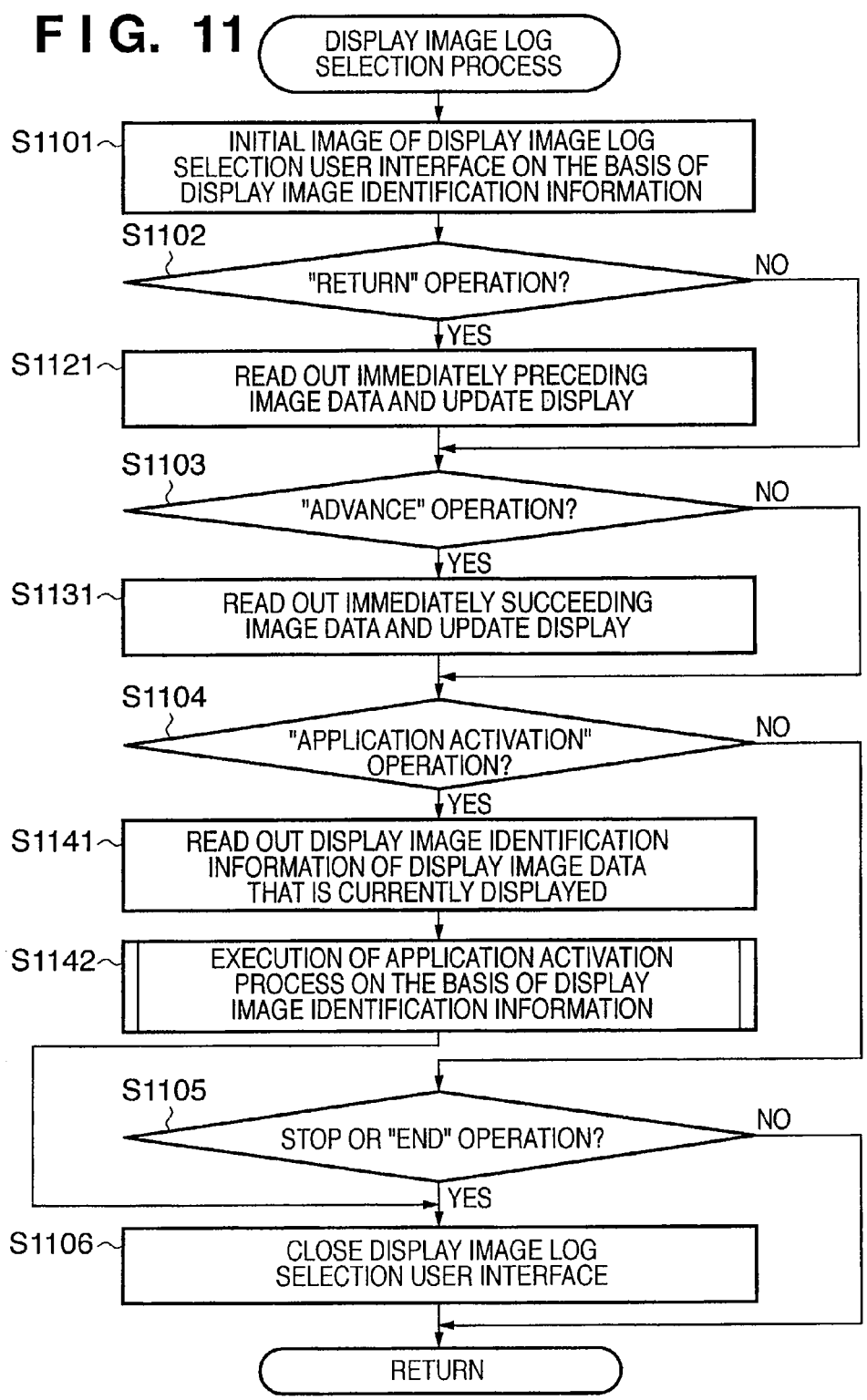
FIG. 11 is a flowchart showing a detailed process procedure for an operation instruction for the display image log selection user interface.

FIG. 11 is a flowchart showing a detailed process procedure for an operation instruction for the display image log selection user interface.

The display image log selection user interface is activated by clicking on a predetermined function key. In step S1101, the initial image of the display image log selection user interface 600 is displayed. The latest display image data is read out and displayed in the capture display area 610 based on the display image log information 210.

The content log display area 620 is generated by arranging the pieces of information 510, 520, and 530 on the time axis based on information registered in the log association information 212 and log registration time information (not shown).

Referring back to FIG. 11, in step S1102, the display image log selection unit 213 confirms the presence/absence of a "return" operation by click on the return button 632 by the mouse 130 or input of the "←" key on the keyboard 140.

If it is determined in step S1102 that no "return" operation exists, the process advances to step S1103. In step S1103, the display image log selection unit 213 confirms the presence/absence of an "advance" operation by click on the advance button 633 using the mouse 130 or by input of the "→" key on the keyboard 140.

If it is determined in step S1103 that no "advance" operation exists, the process advances to step S1104. In step S1104, it is confirmed whether an "application activation" operation by click on the application activation button 631 using the mouse 130 or by input of the "Enter" key on the keyboard 140 exists.

If it is determined in step S1104 that no "application activation" operation exists, the process advances to step S1105. In step S1105, it is determined whether an "end" operation exists. If it is determined that an "end" operation exists, the process advances to step S1106 to close the display image log selection user interface. Then, the process shown in FIG. 11 is ended, and the process returns to steps S701 to S703 in FIG. 7. If it is determined that no "end" operation exists, the process shown in FIG. 11 is directly ended, and the process returns to steps S701 to S703 in FIG. 7.

If it is determined in step S1102 that a "return" operation exists, the process advances to step S1121. In step S1121, display image data that is located on the time axis before the display image data currently displayed in the capture display area 610 is read out and displayed by referring to the display image log information 210. The indicator 621 on the display image log selection user interface 600 is moved based on the time information in step S901 of the display image log recording process in FIG. 9. The method of determining the display position of the indicator 621 is not limited to this. For example, information about a time may be added to each of the pieces of display image information 410, 420, and 430 in the display image log information 210 to determine the display position of the indicator 621 based on it.

If it is determined in step S1103 that an "advance" operation exists, the process advances to step S1131. In step S1131, display image data that is located on the time axis after the display image data currently displayed in the capture display area 610 is read out and displayed by referring to the display image log information 210. The indicator 621 on the display image log selection user interface 600 is moved based on the time information in step S901 of the display image log recording process in FIG. 9. The method of determining the display position of the indicator 621 is not limited to this. For example, information about a time may be added to each of the pieces of display image information 410, 420, and 430 in the display image log information 210 to determine the display position of the indicator 621 based on it.

If it is determined in step S1104 that an "application activation" operation exists, the process advances to step S1141. In step S1141, display image identification information corresponding to the display image data currently displayed in the capture display area 610 is read out. In step S1142, an application activation process (to be described later) is executed based on the readout display image identification information, and the process advances to step S1106.

<7.6 Procedure of Application Activation Process>

Figure 12:
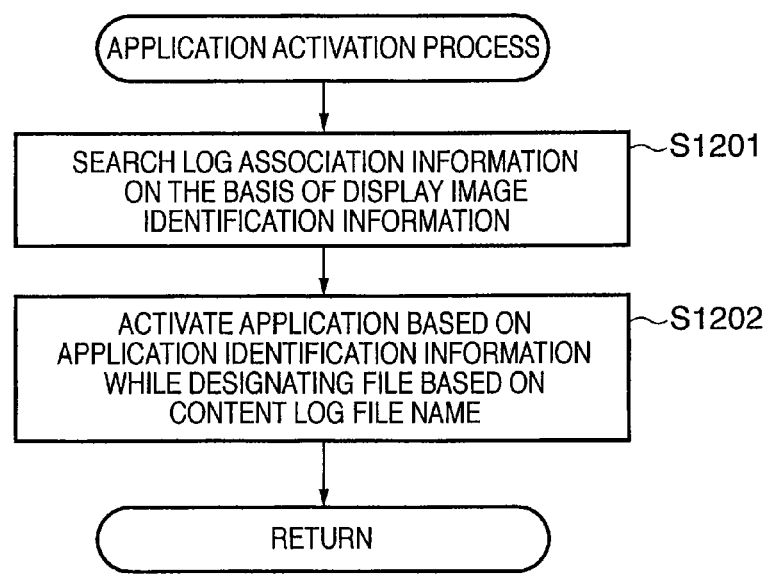
FIG. 12 is a flowchart showing a detailed process procedure of an application activation process.

FIG. 12 is a flowchart showing a detailed process procedure of the application activation process (step S1142 in FIG. 11) of this embodiment. When the application activation process starts, in step S1201, the log association information 212 is searched by using the display image identification information read out in step S1141 as a key. When association information having the display image identification information is extracted by search, application identification information and a content log file name registered in association with the display image identification information are recognized.

In step S1202, an application corresponding to the application identification information recognized in step S1201 is activated. Additionally, a backup file corresponding to the content log file name recognized in step S1201 is read out from the content log folder 300.

This allows for easy restoration of a backup file corresponding to a user's desired display image displayed in the capture display area 610.

As is apparent from the above description, according to this embodiment, the user can easily return content that is being edited to an arbitrary state. It is therefore possible to improve the convenience of the user in the restoring operation. In addition, according to this embodiment, restoration is possible independently of the type of activated application.

Second Embodiment

An information processing apparatus according to the second embodiment of the present invention will be described next in detail with reference to the accompanying drawings.

The hardware configuration of the information processing apparatus according to the second embodiment is the same as in the first embodiment described with reference to FIG. 1. Display image identification information is the same as in the first embodiment described with reference to FIG. 4. The display image log selection user interface is the same as in the first embodiment described with reference to FIG. 6. The procedure of the application activation process is the same as in the first embodiment described with reference to FIG. 7. The procedure of the process for an operation instruction for the display image log selection user interface is the same as in the first embodiment described with reference to FIG. 11.

<1. Functional Arrangement of Information Processing Apparatus>

Figure 13:
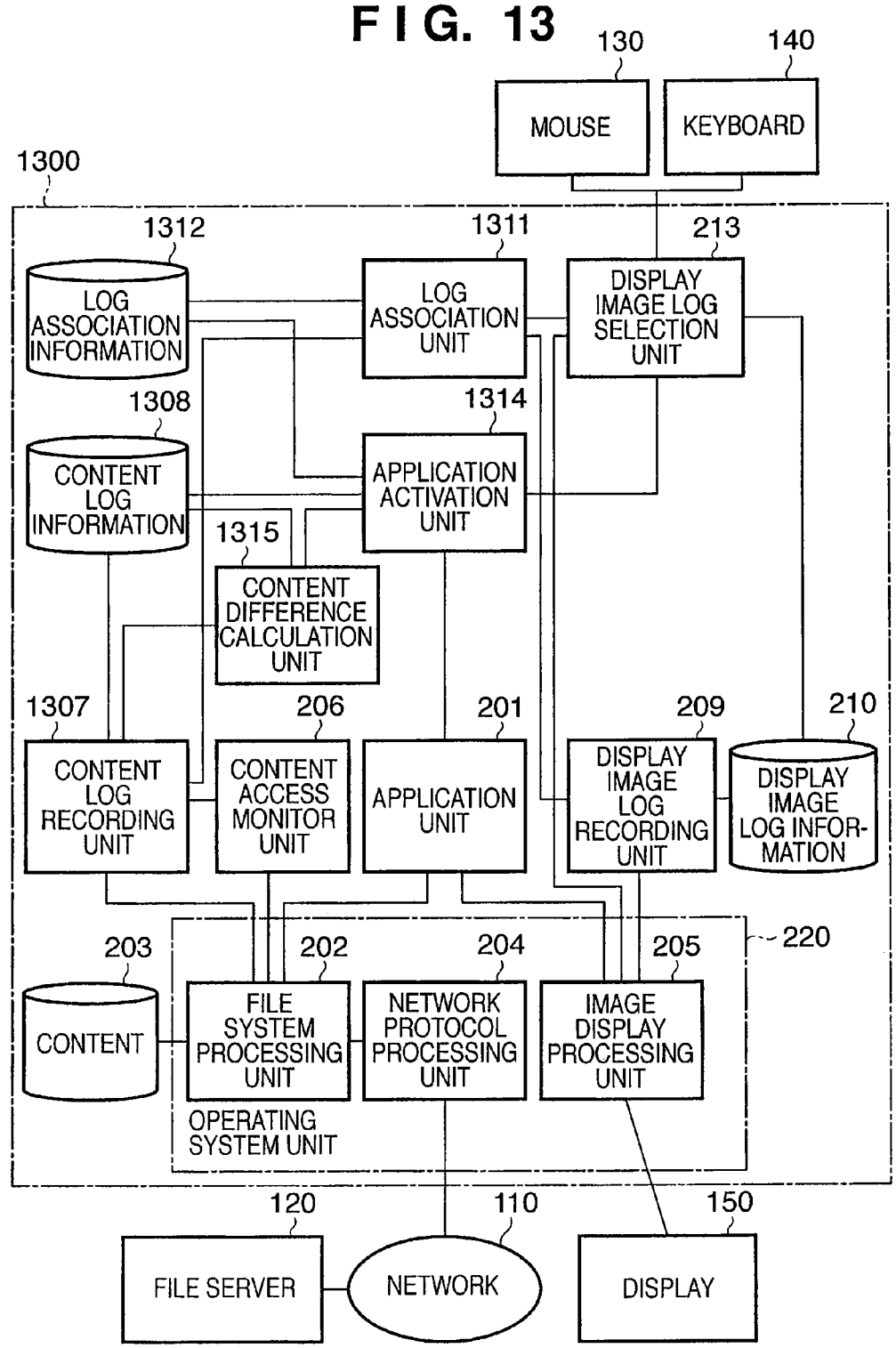
FIG. 13 is a block diagram showing the functional arrangement of an information processing apparatus.

FIG. 13 is a block diagram showing the functional arrangement of the information processing apparatus according to the second embodiment. The same reference numerals as in the first embodiment described with reference to FIG. 2 denote the same functions in FIG. 13, and a description thereof will be omitted. As shown in FIG. 13, an information processing apparatus 1300 comprises an operating system unit 220 and an application unit 201.

The information processing apparatus 1300 also comprises a content access monitor unit 206, content log recording unit 1307, and content difference calculation unit 1315 as components to implement the restoring function. The information processing apparatus 1300 also comprises a display image log recording unit 209, log association unit 1311, display image log selection unit 213, and application activation unit 1314 as components to implement the restoring function.

<1.1 Arrangements of Operating System Unit and Application Unit>

The operating system unit 220 and application unit are the same as in the first embodiment, and a description thereof will be omitted.

<1.2 Components to Implement Restoring Function>

The components to implement the restoring function in the information processing apparatus 1300 of this embodiment will be described next.

The content difference calculation unit 1315 calculates the difference between backup files.

The content log recording unit 1307 reads out a content as an access target, as needed, based on the monitor result of the content access monitor unit 206. The content difference calculation unit 1315 calculates the difference. The difference calculation result with a predetermined file name (difference file name) is stored in the content log folder.

A plurality of difference files having content log file names and stored in the content log folder will be collectively referred to as "content log information" 1308.

In storing a difference file, the content log recording unit 1307 notifies the log association unit 1311 (to be described later) of information necessary for an association process. More specifically, the content log recording unit 1307 notifies the log association unit 1311 of application identification information, a content log reference file name, and difference file name.

The log association unit 1311 associates the pieces of information received from the content log recording unit 1307 and display image log recording unit 209 with each other and registers them as log association information 1312. More specifically, the display image identification information, application identification information, content log reference file name, and difference file name are registered as the log association information 1312.

Upon receiving the display image identification information from the display image log selection unit 213, the application activation unit 1314 refers to the log association information 1312. The application activation unit 1314 recognizes application identification information, content log reference file name, and difference file name registered in association with the display image identification information. Then, the application activation unit 1314 activates an application corresponding to the application identification information, reads out a backup file having the recognized content log reference file name and a difference file having the recognized difference file name from the content log information 1308, and restores the file. The restored file is loaded by the activated application.

With this process, the state of the display window corresponding to the display image data selected by the user can be restored.

<2. Configuration of Content Log Information>

Figure 14:
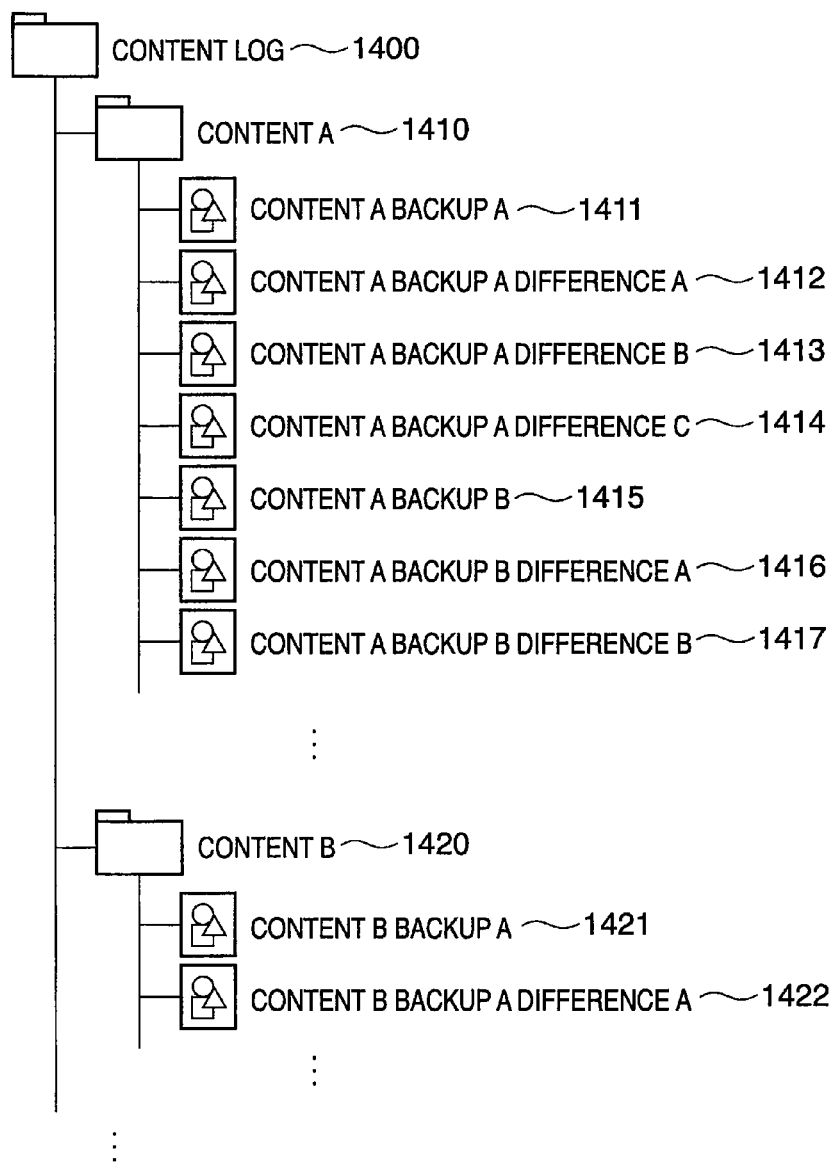
FIG. 14 is a conceptual view showing the configuration of content log information in the information processing apparatus.

FIG. 14 is a conceptual view (example) showing the configuration of the content log information 1308 in the information processing apparatus 1300 of this embodiment. In FIG. 14, a content log folder 1400 stores contents A and B. The content log folder 1400 includes a content A folder 1410 and a content B folder 1420.

The content A folder 1410 stores a backup file 1411 (content log reference file name: content A backup A) as a backup of content A. The content A folder 1410 also stores backup files 1412 to 1414 (difference file names: content A backup A difference A, content A backup A difference B, and content A backup A difference C) as difference files.

A new backup file 1415 (content log reference file name: content A backup B) is created when the content largely changes or every time a predetermined number of difference files are created, and stored in the content log folder 1400.

As difference files to the backup file 1415, backup files 1416 and 1417 (difference file names: content A backup B difference A and content A backup B difference B) are created and stored together.

The content B folder 1420 stores a backup file 1421 (content log reference file name: content B backup A) as a backup of content B. The content B folder 1420 also stores a backup file 1422 (difference file name: content B backup A difference A) as a difference file.

The file names, the folder names, the number of files, the number of folders, and the folder structure are not limited to those described above.

<3. Configuration of Log Association Information>

Figure 15:
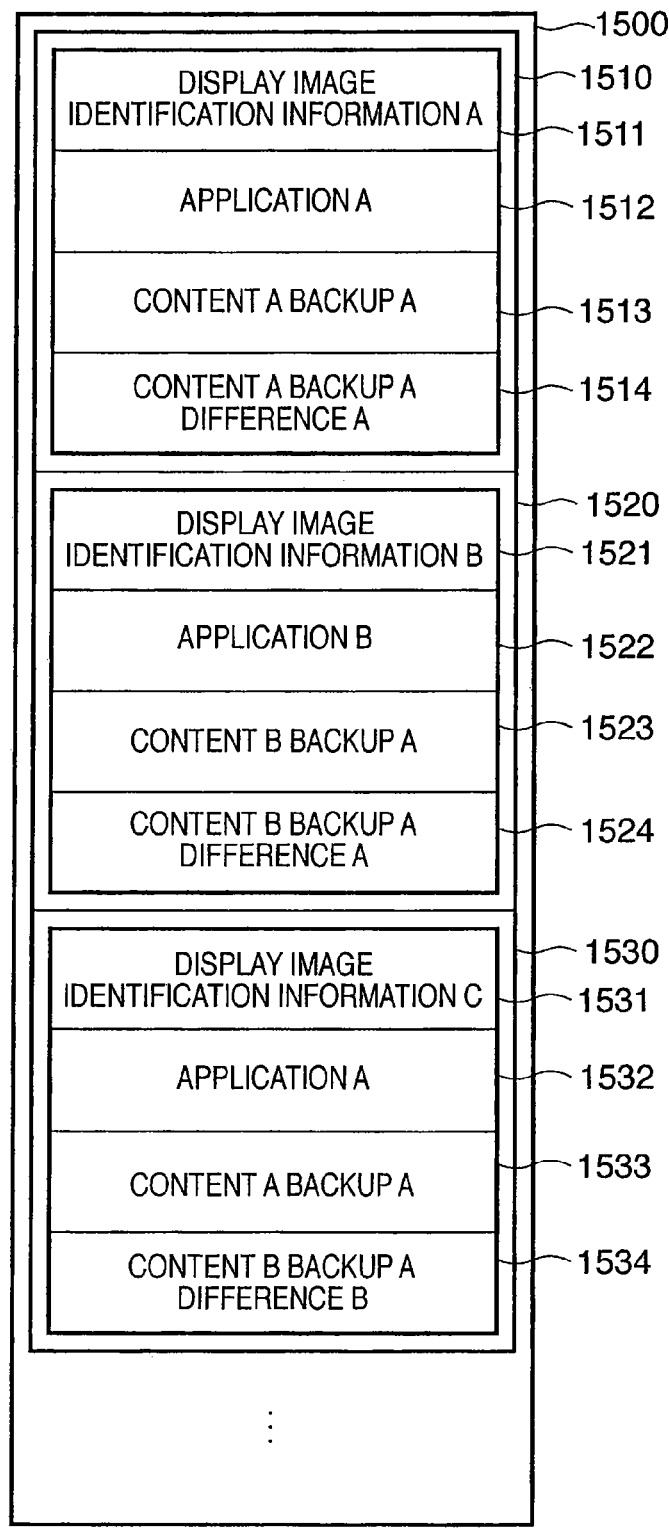
FIG. 15 is a conceptual view of log association information of the information processing apparatus.

FIG. 15 is a conceptual view (example) of the log association information 1312 of the information processing apparatus 1300 of this embodiment. The log association information 1312 is generated every time a content log reference file name, difference file name, and application identification information are received from the content log recording unit 1307.

As shown in FIG. 15, the log association information 1312 includes pieces of association information 1510, 1520, and 1530 each corresponding to one association. The pieces of association information 1510, 1520, and 1530 each corresponding to an association contain pieces of display image identification information 1511, 1521, and 1531 and pieces of application identification information 1512, 1522, and 1532, respectively.

The pieces of association information 1510, 1520, and 1530 each corresponding to an association also contain content log reference file names 1513, 1523, and 1533 and difference file names 1514, 1524, and 1534, respectively. The number of association information in the log association information 1312 and the data structure are not limited to those described above.

<4. Procedure of Content Log Recording Process>

Figure 16:
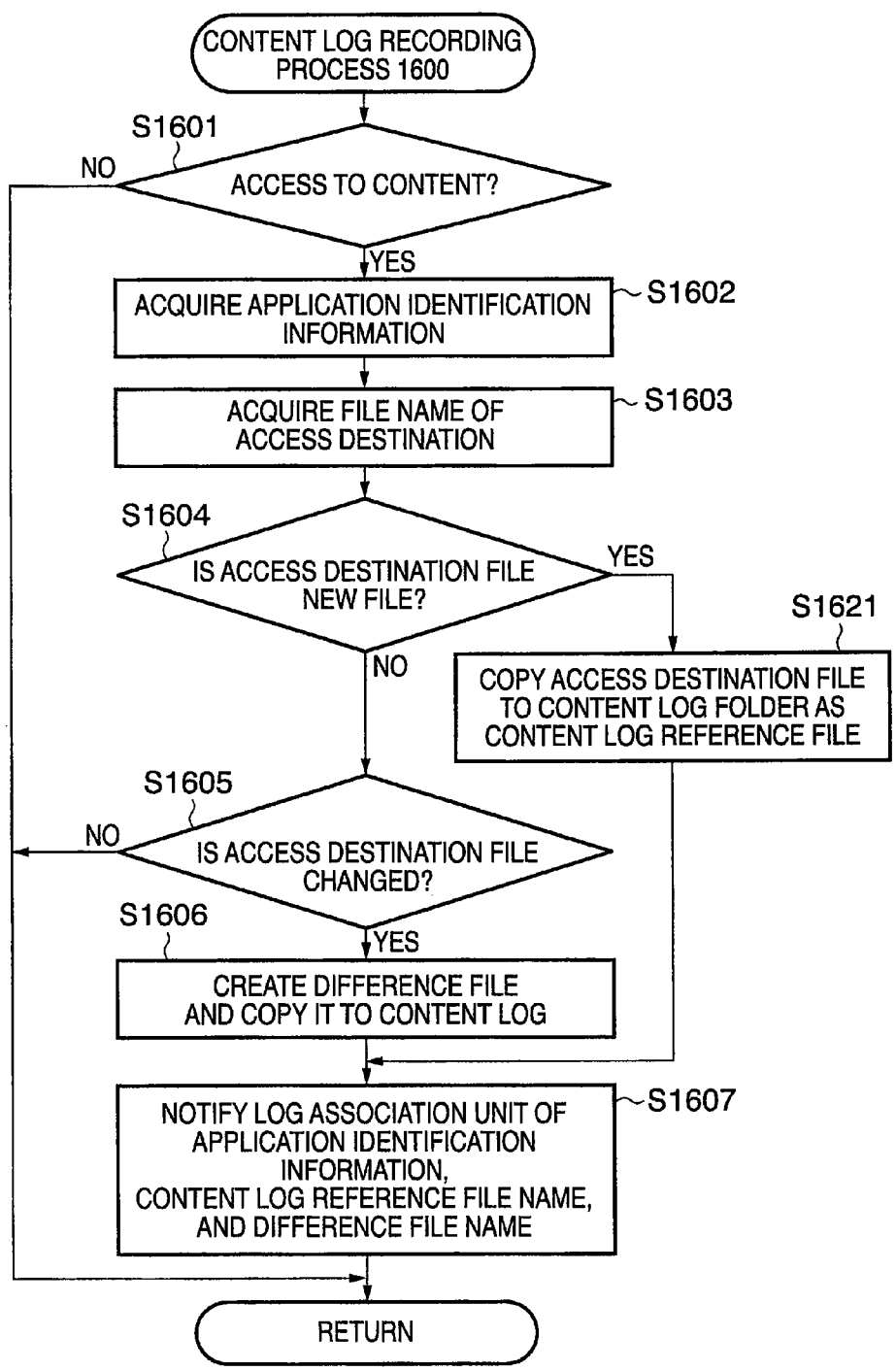
FIG. 16 is a flowchart showing a detailed process procedure of a content log recording process.

FIG. 16 is a flowchart showing a detailed process procedure of the content log recording process (step S701 in FIG. 7) of this embodiment. When the content log recording process starts, the content access monitor unit 206 confirms the presence/absence of access to content 203 (step S1601).

If no access to the content 203 exists (NO in step S1601), the content log recording process is ended (the process advances to step S704 in FIG. 7).

If it is determined in step S1601 that access to the content 203 exists, the process advances to step S1602. In step S1602, the content log recording unit 1307 acquires, from a file system processing unit 202, the application identification information of the application that has accessed the content 203.

In step S1603, the file name of the access destination is acquired. In step S1604, the content log information 1308 is searched based on the acquired file name of the access destination.

More specifically, it is confirmed whether the content log folder 1400 contains a folder having the same file name as the file name of the access destination. If the content log folder 1400 contains no folder having the same file name as the file name of the access destination, the content with the file name of the access destination is determined as a new file. If the content log folder 1400 contains a folder having the same file name as the file name of the access destination, the content with the file name of the access destination is determined not to be a new file.

Referring back to FIG. 16, if it is determined in step S1604 that the file of the access destination is a new file, the process advances to step S1621 to store the file of the access destination in the content log folder 1400 as a content log reference file. Then, the process advances to step S1607.

If it is determined in step S1604 that the file is not a new file, it is determined in step S1605 whether the contents of the file of the access destination have been changed. If it is determined in step S1605 that the contents of the file of the access destination have not been changed, the content log recording process is ended.

If it is determined in step S1605 that the contents of the file of the access destination have been changed, the process advances to step S1606. In step S1606, the content difference calculation unit 1315 creates a difference file and stores it in the content log folder 1400.

In step S1607, the log association unit 1311 is notified of the application identification information, content log reference file name, and difference file name. After that, the content log recording process is ended.

<5. Procedure of Log Association Process>

Figure 17:
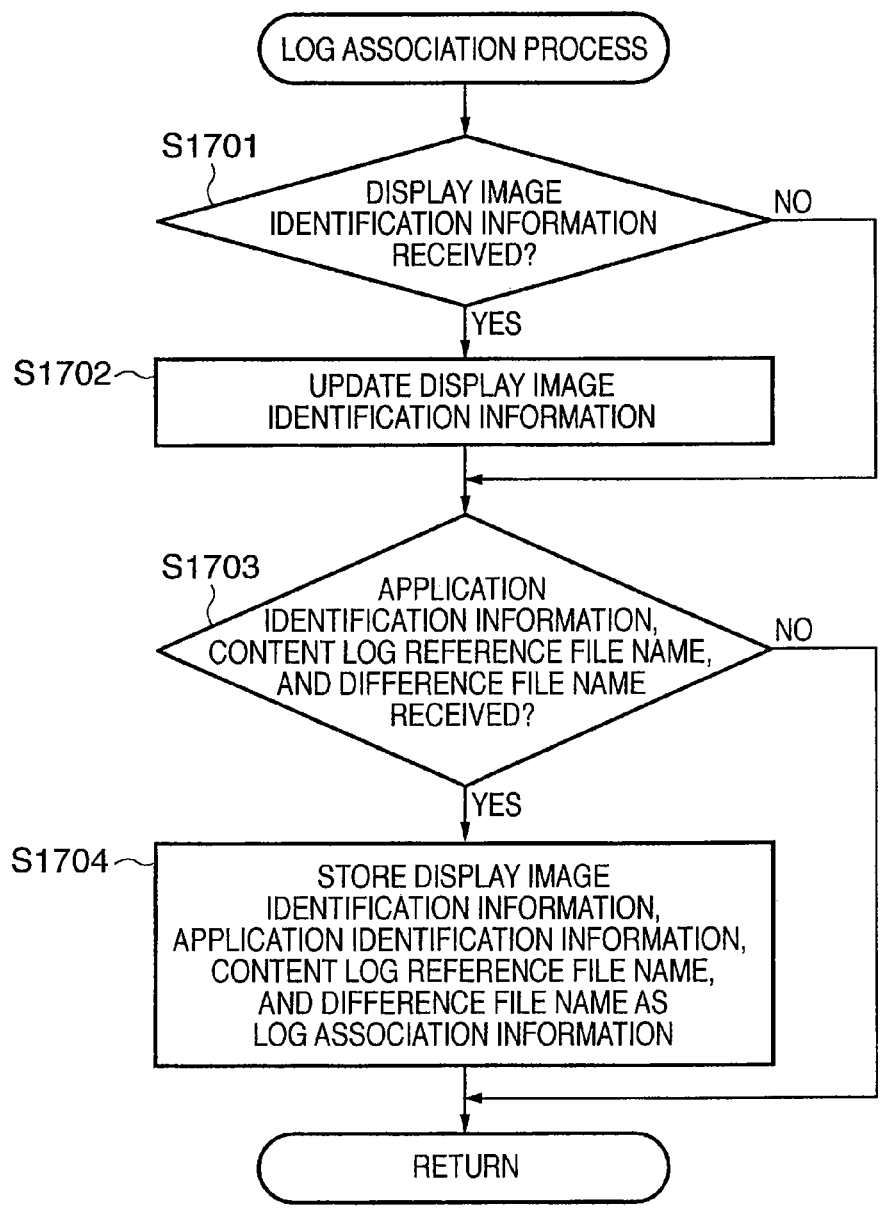
FIG. 17 is a flowchart showing a detailed process procedure of a log association process.

FIG. 17 is a flowchart showing a detailed process procedure of the log association process (step S703 in FIG. 7) of this embodiment. When the log association process starts, the log association unit 1311 starts receiving display image identification information, application identification information, content log reference file name, and difference file name. In step S1701, the presence/absence of reception of display image identification information is determined. If it is determined that no display image identification information is received, the process advances to step S1703.

If it is determined in step S1701 that display image identification information is received, the process advances to step S1702 to temporarily store the display image identification information in a predetermined area of a RAM 103. If display image identification information is already stored in the predetermined area of the RAM 103, it is updated.

In step S1703, the presence/absence of reception of application identification information, content log reference file name, and difference file name is determined. If it is determined that application identification information, content log reference file name, and difference file name are received, the process advances to step S1704.

In step S1704, the display image identification information stored in the predetermined area of the RAM 103 and the received application identification information, content log reference file name, and difference file name are sequentially registered in the log association information 1312 in association with each other. The display image identification information temporarily stored in the predetermined area of the RAM 103 is cleared once it is registered in the log association information 1312. When registration in step S1704 finishes, the log association process is ended.

If it is determined in step S1703 that none of application identification information, content log reference file name, and difference file name is received, the log association process is directly ended.

<6. Procedure of Application Activation Process>

Figure 18:
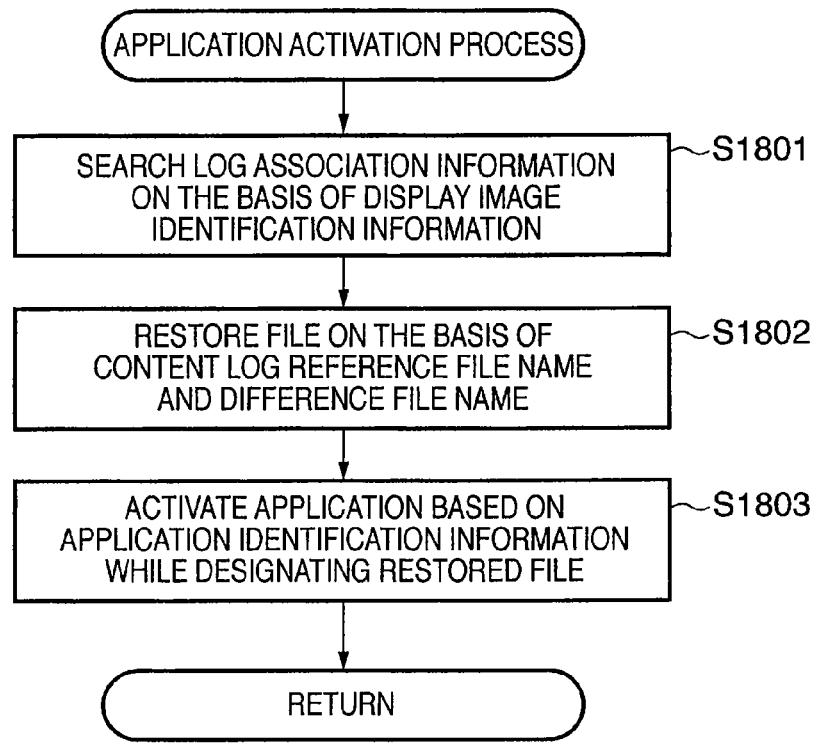
FIG. 18 is a flowchart showing a detailed process procedure of an application activation process.

FIG. 18 is a flowchart showing a detailed process procedure of the application activation process (step S1142 in FIG. 11) of this embodiment. When the application activation process starts, in step S1801, the log association information 1312 is searched by using the display image identification information read out in step S1141 as a key. When association information having the display image identification information is extracted by a search, application identification information, content log reference file name, and difference file name registered in association with the display image identification information are recognized.

In step S1802, a content log reference file corresponding to the content log reference file name recognized in step S1801 and a difference file corresponding to the difference file name are read out from the content log information 1308. A file is restored based on the readout reference file and difference file.

In step S1803, an application corresponding to the application identification information recognized in step S1801 is activated, and the restored file is loaded. This allows easy restoration of a file corresponding to a user's desired display image displayed in a capture display area 610.

As is apparent from the above description, according to this embodiment, the user can easily return content that is being edited to an arbitrary state. It is therefore possible to improve the convenience of the user in the restoring operation. In addition, according to this embodiment, restoration is possible independently of the type of activated application.

Further, in this embodiment, since content log information is stored as a difference file, the storage capacity can be reduced.

Third Embodiment

The third embodiment of the present invention will be described next in detail with reference to the accompanying drawings. The hardware configuration according to the third embodiment is the same as in the first embodiment described with reference to FIG. 1. Display image identification information is the same as in the first embodiment described with reference to FIG. 4. The display image log selection user interface is the same as in the first embodiment described with reference to FIG. 6. The application activation process is the same as in the first embodiment described with reference to FIG. 7. The display image log selection process is the same as in the first embodiment described with reference to FIG. 11.

<1. Functional Arrangement of Information Processing Apparatus>

Figure 19:
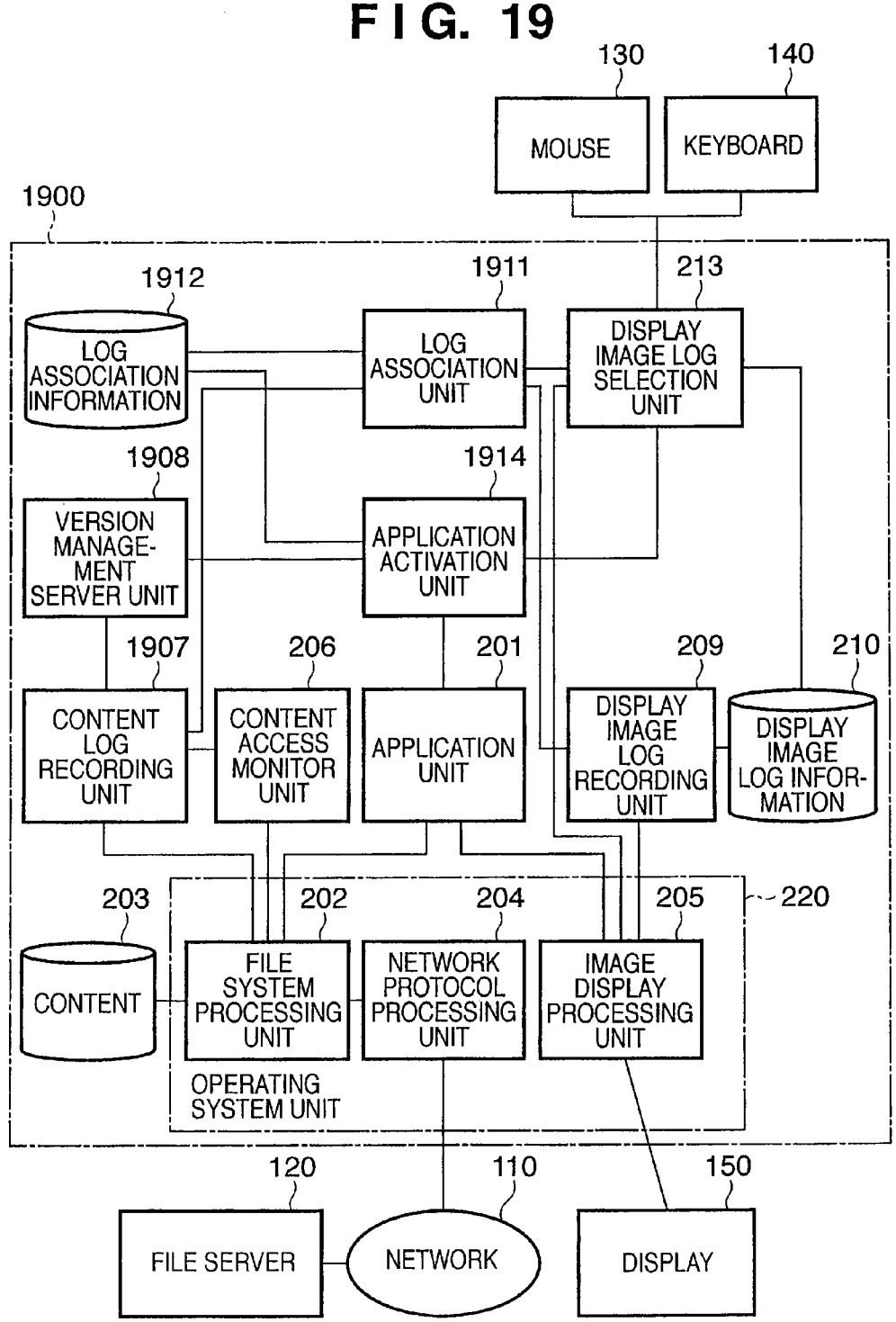
FIG. 19 is a block diagram showing the functional arrangement of an information processing apparatus.

FIG. 19 is a block diagram showing the functional arrangement of the information processing apparatus according to the third embodiment. The same reference numerals as in the first embodiment described with reference to FIG. 2 denote the same functions in FIG. 19, and a description thereof will be omitted. As shown in FIG. 19, an information processing apparatus 1900 comprises an operating system unit 220 and an application unit 201. The information processing apparatus 1900 also comprises a content access monitor unit 206, content log recording unit 1907, and version management server unit 1908 as components to implement the restoring function. The information processing apparatus 1900 also comprises a display image log recording unit 209, log association unit 1911, display image log selection unit 213, and application activation unit 1914 as components to implement the restoring function.

<1.1 Arrangements of Operating System Unit and Application Unit>

The operating system unit and application unit are the same as in the first embodiment, and a description thereof will be omitted.

<1.2 Components to Implement Restoring Function>

The components to implement the restoring function in the information processing apparatus 1900 of this embodiment will be described next.

The version management server unit 1908 registers a file and manages its version in every update. The content log recording unit 1907 reads out a content as an access target, as needed, based on the monitor result of the content access monitor unit 206 and registers it in the version management server unit 1908.

The content log recording unit 1907 notifies the log association unit 1911 (to be described later) of information necessary for an association process and, more specifically, application identification information, a file name, and version information (to be described later).

The log association unit 1911 registers the pieces of information received from the content log recording unit 1907 and display image log recording unit 209 and, more specifically, display image identification information, application identification information, file name, and version information in log association information 1912 that defines the association between them.

Upon receiving the display image identification information from the display image log selection unit 213, the application activation unit 1914 refers to the log association information 1912. The application activation unit 1914 recognizes application identification information, file name, and version information registered in association with the display image identification information.

Then, the application activation unit 1914 activates an application corresponding to the application identification information and reads out a file having the recognized file name and recognized version information from the version management server unit 1908. The readout file is loaded by the activated application.

<2. Configuration of Log Association Information>

Figure 20:
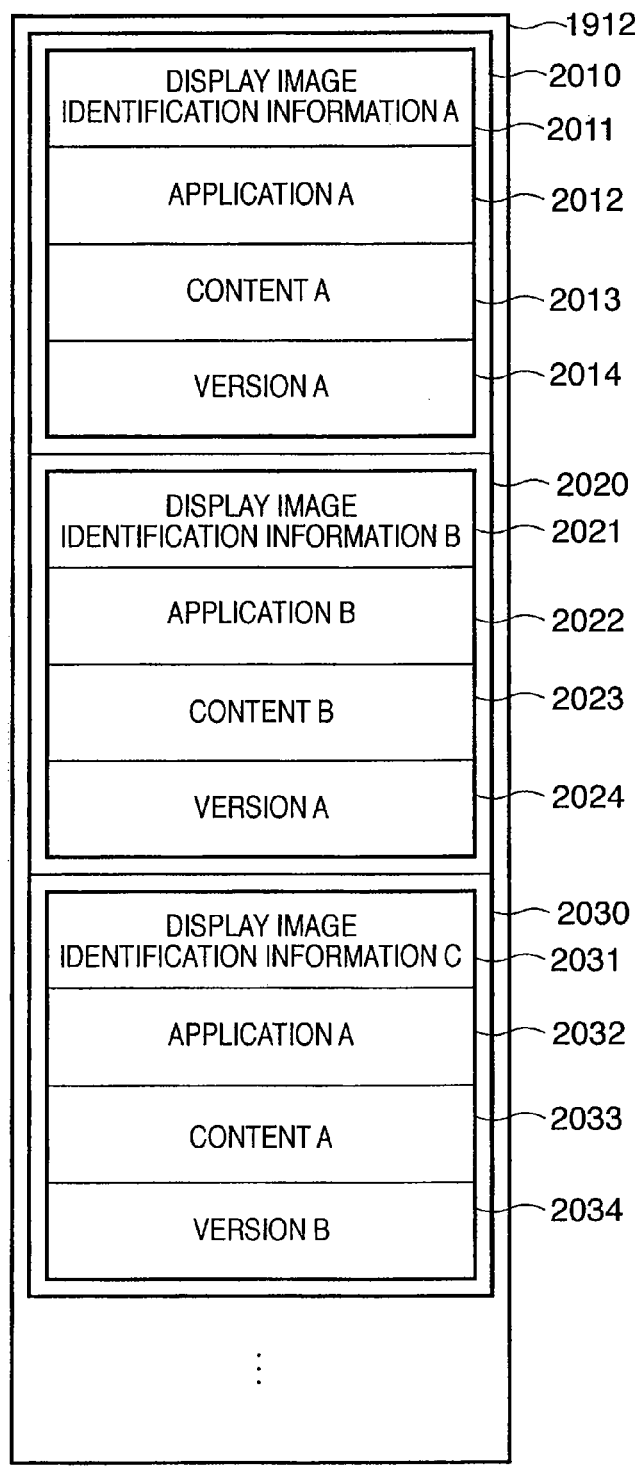
FIG. 20 is a conceptual view showing log association information of the information processing apparatus.

FIG. 20 is a conceptual view (example) of the log association information 1912 of the information processing apparatus 1900 of this embodiment. The log association information 1912 is generated every time a file name, version information, and application identification information are received from the content log recording unit 1907.

As shown in FIG. 20, the log association information 1912 includes pieces of association information 2010, 2020, and 2030 each corresponding to one association. The pieces of association information 2010, 2020, and 2030 each corresponding to an association contain pieces of display image identification information 2011, 2021, and 2031 and pieces of application identification information 2012, 2022, and 2032, respectively. The pieces of association information 2010, 2020, and 2030 each corresponding to an association also contain content file names 2013, 2023, and 2033 and pieces of version information 2014, 2024, and 2034, respectively. The number of association information in the log association information 1912 and the data structure are not limited to those described above.

<3. Procedure of Content Log Recording Process>

Figure 21:
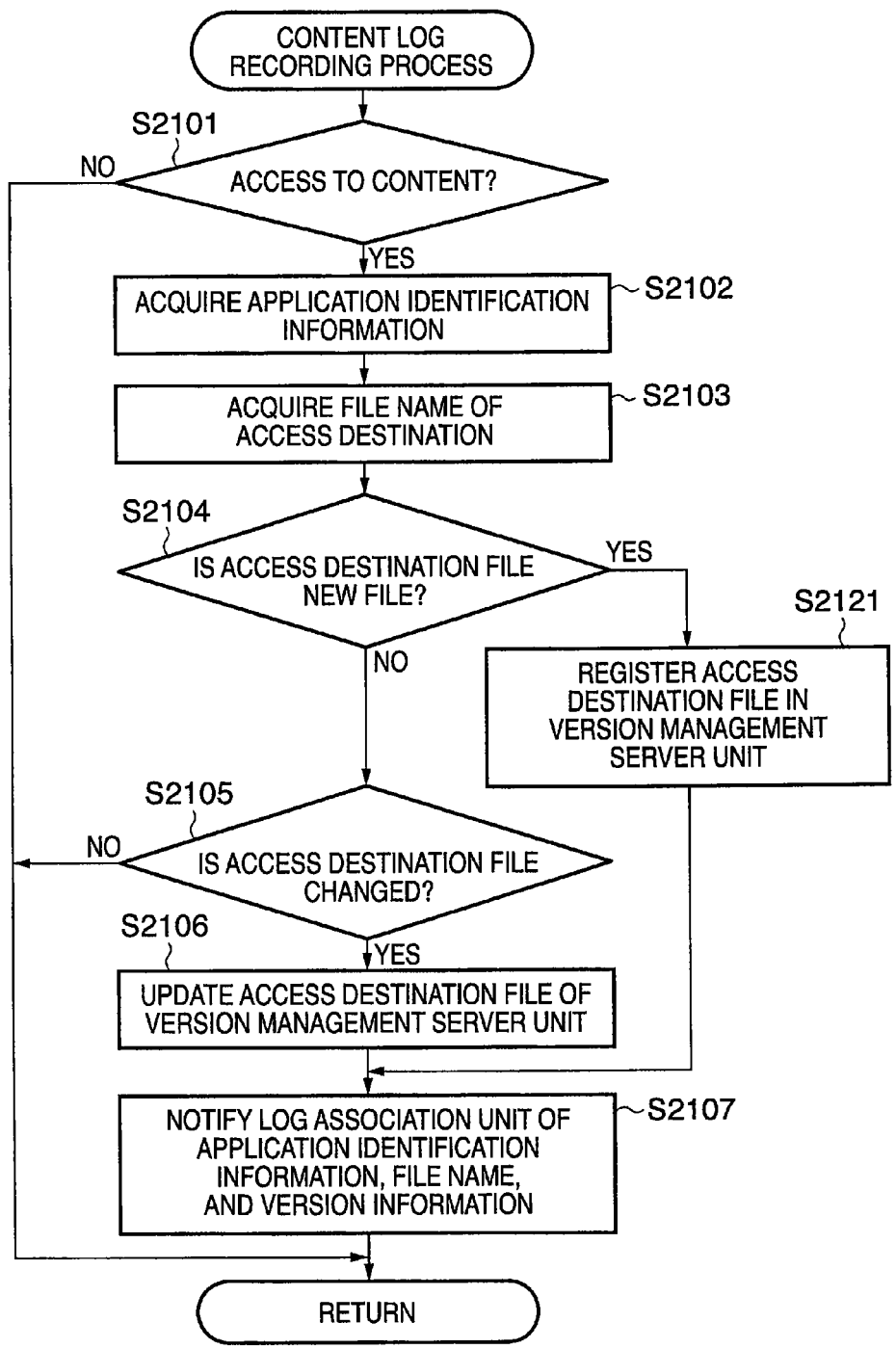
FIG. 21 is a flowchart showing a detailed process procedure of a content log recording process.

FIG. 21 is a flowchart showing a detailed process procedure of the content log recording process (step S701 in FIG. 7) of this embodiment. When the content log recording process starts, the content access monitor unit 206 confirms the presence/absence of access to a content 203 (step S2101).

If no access to the content 203 exists (NO in step S2101), the content log recording process is ended (the process advances to step S704 in FIG. 7).

If it is determined in step S2101 that access to the content 203 exists, the process advances to step S2102. In step S2102, the content log recording unit 1907 acquires, from a file system processing unit 202, the application identification information of the application that has accessed the content 203.

In step S2103, the file name of the access destination is acquired. In step S2104, the version management server unit 1908 is searched on the basis of the acquired file name of the access destination.

More specifically, if the version management server unit 1908 is a CVS (Concurrent Versions System), it is confirmed on the basis of a log command with a designated access destination file name whether a log is returned. If an error message indicating that no file exists is returned, the content is determined as a new file. If a normal log is returned, the content with the file name of the access destination is determined not to be a new file.

If it is determined in step S2104 that the file is a new file, the process advances to step S2121 to store the file of the access destination in the version management server unit 1908. Then, the process advances to step S2107.

If it is determined in step S2104 that the file is no new file, it is determined in step S2105 whether the contents of the file of the access destination have been changed. If it is determined in step S2105 that the contents of the file of the access destination have not been changed, the content log recording process is ended.

More specifically, it is confirmed on the basis of a diff command with a designated access destination file name whether the file has been changed. If no difference is returned, it is determined that no change exists. If a difference is returned, it is determined that a change exists.

If it is determined in step S2105 that the contents of the file of the access destination have been changed, the process advances to step S2106. In step S2106, the version management server unit 1908 is updated. In step S2107, the log association unit 1911 is notified of the application identification information, file name, and version information. After that, the content log recording process is ended.

<4. Procedure of Log Association Process>

Figure 22:
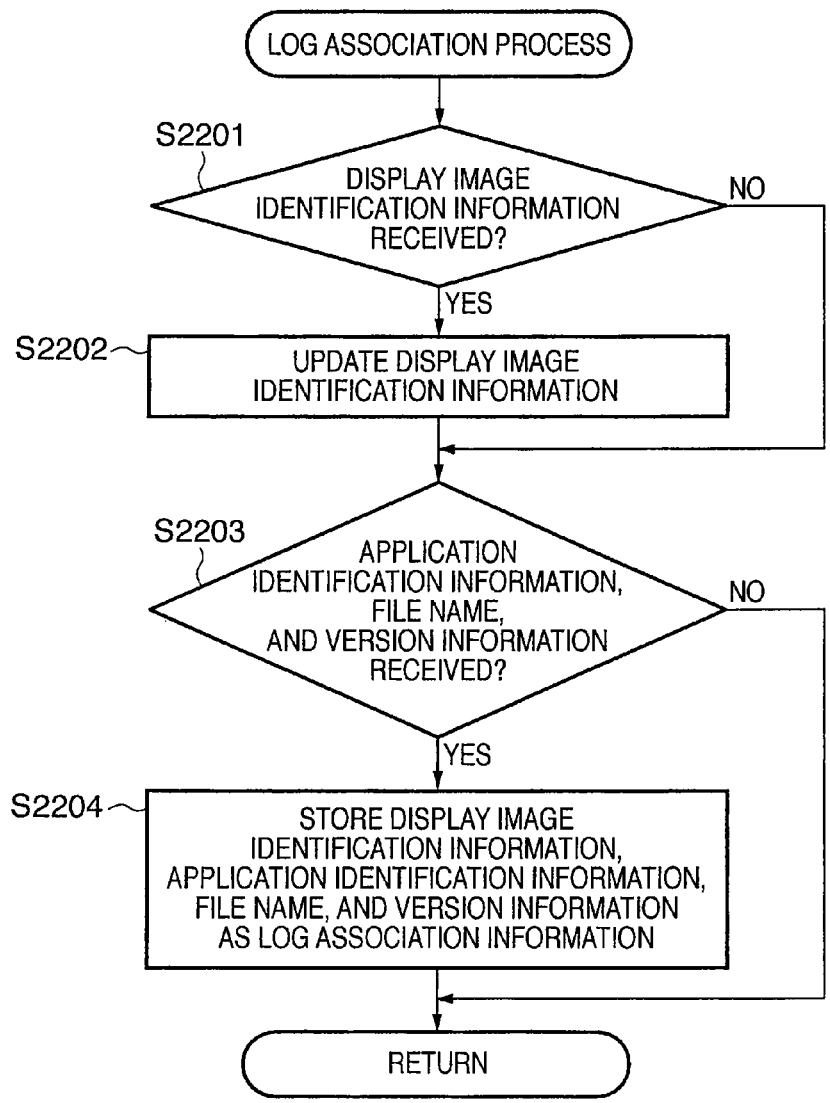
FIG. 22 is a flowchart showing a detailed process procedure of a log association process.

FIG. 22 is a flowchart showing a detailed process procedure of the log association process (step S703 in FIG. 7) of this embodiment. When the log association process starts, the log association unit 1911 starts receiving display image identification information, application identification information, file name, and version information. In step S2201, the presence/absence of reception of display image identification information is determined. If it is determined that no display image identification information is received, the process advances to step S2203.

If it is determined in step S2201 that display image identification information is received, the process advances to step S2202 to temporarily store the display image identification information in a predetermined area of a RAM 103. If display image identification information is already stored in the predetermined area of the RAM 103, it is updated.

In step S2203, the presence/absence of reception of application identification information, file name, and version information is determined. If it is determined that application identification information, file name, and version information are received, the process advances to step S2204.

In step S2204, the display image identification information, application identification information, file name, and version information are sequentially registered in the log association information 1912 in association with each other. The display image identification information temporarily stored in the predetermined area of the RAM 103 is cleared once it is registered in the log association information 1912. When registration in step S2204 finishes, the log association process is ended.

If it is determined in step S2203 that none of application identification information, file name, and version information is received, the log association process is directly ended.

<5. Procedure of Application Activation Process>

Figure 23:
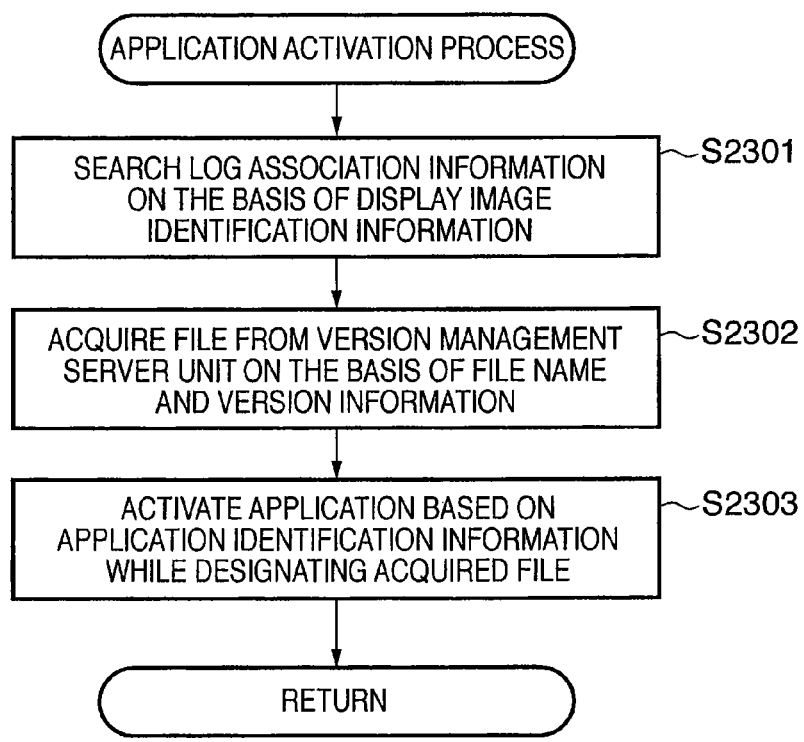
FIG. 23 is a flowchart showing a detailed process procedure of an application activation process.

FIG. 23 is a flowchart showing a detailed process procedure of the application activation process (step S1142 in FIG. 11) of this embodiment. When the application activation process starts, in step S2301, the log association information 1912 is searched by using the display image identification information read out in step S1141 as a key. When association information having the display image identification information is extracted by search, application identification information, file name, and version information registered in association with the display image identification information are recognized.

In step S2302, a file is acquired from the version management server unit 1908 on the basis of the file name and version information recognized in step S2301.

In step S2303, an application corresponding to the application identification information recognized in step S2301 is activated, and the acquired file is loaded. This allows to easily restore a file corresponding to a user's desired display image displayed in a capture display area 610.

As is apparent from the above description, according to this embodiment, the user can easily return a content under editing to an arbitrary state. It is therefore possible to improve the convenience of the user in the restoring operation. In addition, according to this embodiment, restoration is possible independently of the type of activated application.

Further, in this embodiment, since the general-purpose content log management function can commonly be used by other applications, the foot print and the working memory capacity can be reduced.

Other Embodiments

The present invention is also applicable to a system including a plurality of devices (e.g., host computer, interface device, reader, and printer) or an apparatus (e.g., copying machine or facsimile apparatus) including a single device.

The object of the present invention is achieved even by supplying a storage medium which records software program codes for implementing the functions of the above-described embodiments to the system or apparatus. The computer (or CPU or MPU) of the system or apparatus reads out and executes the program codes stored in the storage medium, thereby implementing the functions. In this case, the storage medium that stores the program codes constitutes the present invention.

Examples of the storage medium to supply the program codes are a Floppy® disk, hard disk, optical disk, magnetooptical disk, CD-ROM, CD-R, magnetic tape, nonvolatile memory card, and ROM.

The functions of the above-described embodiments are implemented not only when the computer executes the readout program codes but also, e.g., when the OS (Operating System) running on the computer partially or wholly executes actual processing on the basis of the instructions of the program codes.

The functions of the above-described embodiments are also implemented by writing the program codes read out from the storage medium in the memory of a function expansion board inserted into the computer or a function expansion unit connected to the computer. That is, after the program codes are written in the memory, the CPU of the function expansion board or function expansion unit partially or wholly executes actual processing on the basis of the instructions of the program codes, thereby implementing the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-127884 filed on May 1, 2006, which is hereby incorporated by reference herein in its entirety.

What is claimed is:

1. An information processing apparatus capable of executing an application, comprising:
    a first storage unit configured to store display images obtained by capturing at a predetermined period a display image that includes an application window that is displayed while a user edits the content of a file on the application;
    a second storage unit configured to store restoration information to restore the file to its original state, according to that the content of the file is overwritten;
    a display control unit configured to retrieve the display images corresponding to a time indicated by user operation from the first storage unit and display the retrieved display images on the display screen;
    a reception unit configured to receive an interaction; and
    a reproduction unit configured to, in response to the interaction received by the reception unit, restore the edited file by using the restoration information which is stored at the latest timing prior to the indicated time,
    wherein there is an independent relationship between the predetermined period with which the display image is captured and obtained by the first storage unit and a timing for which the restoration information is stored.

2. The apparatus according to claim 1, wherein
said first storage unit stores a display image identifier to identify the display image in association with the display image,
said second storage unit stores an application identifier to identify the application in association with the restoration information, and
said association unit associates the application identifier and the restoration information with each other.

3. The apparatus according to claim 1, wherein said display unit switches and displays the display images on the basis of a user instruction.

4. The apparatus according to claim 1, wherein, along with the display images stored in the first storage, said display unit displays, in time-series, the timings at which the restoration information was stored.

5. The apparatus according to claim 1, wherein the restoration information is the file in its original state.

6. The apparatus according to claim 1, wherein the restoration information contains at least information representing a difference between the file in its original state and the edited file.

7. The apparatus according to claim 1, wherein the restoration information contains the file in its original state and version information of the file.

8. The apparatus according to claim 1, wherein the display images include a plurality of the application windows for editing the content of the file.

9. The apparatus according to claim 1, wherein the display control unit further displays a time axis that contains a timing of which each of the display images is obtained by the first storage unit, and an indicator that indicates a timing of which each item of the restoration information is stored along the time axis, and the reproduction unit, in response to the interaction received by the reception unit, restores the edited file by using the restoration information stored which is stored at the timing corresponding to the indicator that exists at the latest position prior to the indicated time.

10. The apparatus according to claim 1, further comprising; an association unit configured to associate each of the display images stored in the first storage unit and each item of the restoration information stored in the second storage unit with each other based on the timings at which each of the display images and each item of the restoration information are stored,
wherein the reproduction unit specifies one restoration information which is stored at the latest timing prior to the indicated time, based on the associated information by the association unit.

11. An information processing method of an information processing apparatus capable of executing an application, comprising:
a first storage step for storing display images obtained by capturing at a predetermined period a display image that includes an application window that is displayed while a user edits the content of a file on the application;
a second storage step for storing restoration information to restore the file to its original state according to that the content of the file is overwritten;
a display control step for retrieving the display images corresponding to a time indicated by user operation and displaying the retrieved display images on the display screen;
a reception step for receiving an interaction; and
a reproduction step for, in response to the received interaction, restoring the edited file by using the restoration information which is stored at the latest timing prior to the indicated time,
wherein there is an independent relationship between the predetermined period with which the display image is captured and obtained in the first storage step and a timing for which the restoration information is stored.

12. A storage medium storing a control program which causes a computer to implement an information processing method of claim 11.

* * * * *